(12) United States Patent
Ikeda et al.

(10) Patent No.: US 11,442,348 B2
(45) Date of Patent: Sep. 13, 2022

(54) WAVELENGTH CONVERSION ELEMENT, PHOSPHOR WHEEL, LIGHT SOURCE DEVICE, AND PROJECTION DISPLAY APPARATUS

(71) Applicant: Panasonic Intellectual Property Management Co., Ltd., Osaka (JP)

(72) Inventors: Takashi Ikeda, Osaka (JP); Makoto Maeda, Nara (JP); Yusaku Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 17/141,503

(22) Filed: Jan. 5, 2021

(65) Prior Publication Data
US 2021/0124246 A1  Apr. 29, 2021

Related U.S. Application Data

(63) Continuation of application No. 16/386,883, filed on Apr. 17, 2019, now Pat. No. 10,921,697.

(30) Foreign Application Priority Data

Apr. 26, 2018 (JP) .............................. JP2018-084824
Feb. 27, 2019 (JP) .............................. JP2019-033629

(51) Int. Cl.
*G03B 21/20* (2006.01)
*G02B 26/00* (2006.01)
*G03B 21/00* (2006.01)

(52) U.S. Cl.
CPC .......... *G03B 21/204* (2013.01); *G02B 26/008* (2013.01); *G03B 21/2066* (2013.01); *G03B 21/008* (2013.01); *G03B 21/2073* (2013.01)

(58) Field of Classification Search
CPC .......... F21S 10/007; F21S 10/02; F21V 9/45; F21V 13/08; F21V 5/008; F21V 9/32
See application file for complete search history.

(56) References Cited

U.S. PATENT DOCUMENTS

| 4,486,486 A | 12/1984 | Maeoka et al. |
| 2011/0037380 A1* | 2/2011 | Li ....................... C09K 11/7734 313/503 |
| 2011/0116253 A1 | 5/2011 | Sugiyama |

(Continued)

FOREIGN PATENT DOCUMENTS

| CN | 106597785 A | 4/2017 |
| CN | 107765499 A | 3/2018 |

(Continued)

OTHER PUBLICATIONS

English Translation of Chinese Office Action dated Aug. 31, 2021 in Chinese Patent Application No. 201910331283.0.

*Primary Examiner* — William J Carter
(74) *Attorney, Agent, or Firm* — Wenderoth, Lind & Ponack, L.L.P.

(57) ABSTRACT

A wavelength conversion element includes a first phosphor region and a second phosphor region. The second phosphor region is disposed in a thickness direction of the first phosphor region and has a phosphor particle with a particle size different from a particle size of a phosphor particle positioned in the first phosphor region.

13 Claims, 17 Drawing Sheets

(56) References Cited

U.S. PATENT DOCUMENTS

| | | | |
|---|---|---|---|
| 2013/0193837 A1* | 8/2013 | Ohno | B32B 15/00 |
| | | | 428/690 |
| 2014/0285997 A1 | 9/2014 | Nitta et al. | |
| 2016/0147136 A1* | 5/2016 | Nojima | G03B 21/204 |
| | | | 353/98 |
| 2016/0150200 A1 | 5/2016 | Saka et al. | |
| 2017/0111620 A1 | 4/2017 | Tian et al. | |
| 2018/0052386 A1 | 2/2018 | Hashizume et al. | |
| 2018/0108814 A1* | 4/2018 | Zheng | H01S 5/0087 |

FOREIGN PATENT DOCUMENTS

| | | |
|---|---|---|
| JP | 2010-225960 | 10/2010 |
| JP | 2012-108435 | 6/2012 |
| JP | 2016-099520 | 5/2016 |
| JP | 2016-170359 | 9/2016 |
| JP | 2017-075973 | 4/2017 |
| JP | 2018-036457 | 3/2018 |
| JP | 2018-063858 | 4/2018 |
| WO | 2014/080562 | 5/2014 |

\* cited by examiner

WAVELENGTH CONVERSION ELEMENT, PHOSPHOR WHEEL, LIGHT SOURCE DEVICE, AND PROJECTION DISPLAY APPARATUS

BACKGROUND

1. Technical Field

The present disclosure relates to a wavelength conversion element and a phosphor wheel to be used in a light source device of a projection display apparatus, for example.

2. Description of the Related Art

PTL 1 (Unexamined Japanese Patent Publication No. 2018-36457) discloses a wavelength conversion element that includes a base plate, a phosphor region that contains a first phosphor emitting light upon incidence of excitation light, and an adhesion layer that contains a second phosphor (thermal conductive material) and bonds the base material and the phosphor region.

SUMMARY

The present disclosure provides a wavelength conversion element that improves efficiency of conversion into fluorescent light and thermal efficiency.

The wavelength conversion element in the present disclosure includes a first phosphor region and a second phosphor region. The second phosphor region is disposed in a thickness direction of the first phosphor region and has a phosphor particle with a particle size different from a particle size of a phosphor particle positioned in the first phosphor region.

The wavelength conversion element in the present disclosure is useful in improving the efficiency of conversion into fluorescent light and thermal efficiency.

DETAILED DESCRIPTION

Hereinafter, an exemplary embodiment will be described in detail with reference to the drawings as appropriate. However, an excessively detailed description will not be given in some cases. For example, detailed descriptions of known matters and duplicated descriptions of substantially the same configurations will be sometimes skipped. This is to avoid unnecessary repeating of the following description and to facilitate understanding of those skilled in the art.

The accompanying drawings and the following description are provided to enable those skilled in the art to fully know the disclosure, and are not intended to limit the matters described in the claims.

First Exemplary Embodiment

[1-1-1-1. Configurations of Wavelength Conversion Elements]

Figure 1:
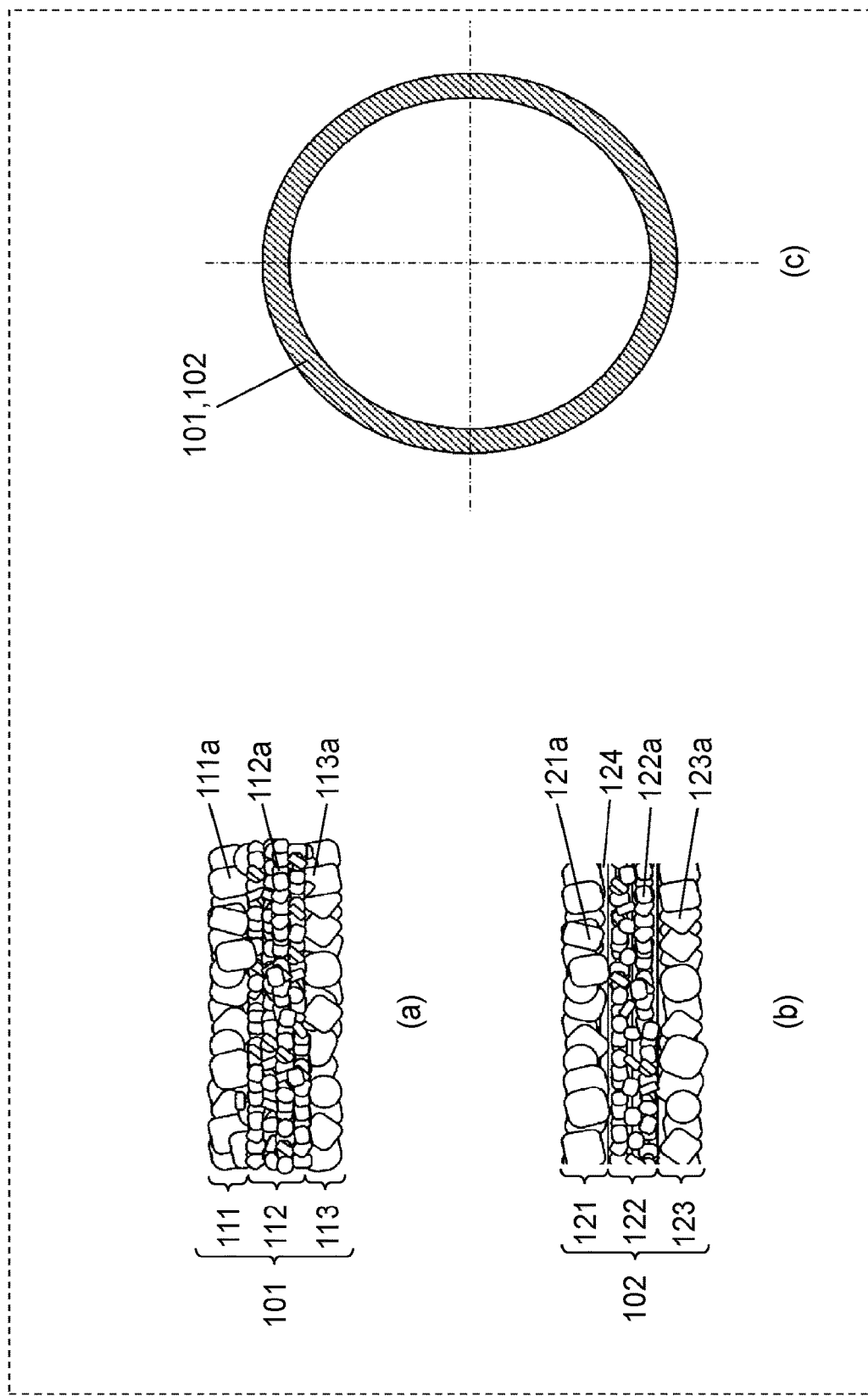
FIG. 1 is a diagram illustrating configurations of a wavelength conversion element according to a first exemplary embodiment.

Hereinafter, configurations of wavelength conversion elements according to a first exemplary embodiment will be described in detail. FIG. 1 is a diagram illustrating the wavelength conversion element according to the first exemplary embodiment. Part (a) of FIG. 1 is a cross-sectional view of a first wavelength conversion element, part (b) of FIG. 1 is a cross-sectional view of a second wavelength conversion element, and part (c) of FIG. 1 is a plan view of a phosphor ring formed by using the first or second wavelength conversion element.

Wavelength conversion element 101 as the first wavelength conversion element according to the first exemplary embodiment illustrated in part (a) of FIG. 1 includes a three-layer phosphor region formed by stacking first phosphor region 111 including phosphor particle 111a, second phosphor region 112 including phosphor particle 112a, and third phosphor region 113 including phosphor particle 113a. As illustrated in part (a) of FIG. 1, phosphor particles different in particle size are disposed in a thickness direction of the phosphor region. In this case, the particle size of phosphor particle 112a constituting second phosphor region 112 disposed in a middle is smaller than the particle size of phosphor particle 111a of first phosphor region 111 on a front side (upper side in part (a) of FIG. 1) and the particle size of phosphor particle 113a of third phosphor region 113 on a back side (lower side of part (a) of FIG. 1).

Phosphor particle 111a in first phosphor region 111 and phosphor particle 113a in third phosphor region 113 may be different or identical. The particle sizes of the phosphor particles are selected from a range of several µm according to the use and function. For example, a difference in particle size between phosphor particles 111a, 113a with larger particle sizes and phosphor particle 112a with a smaller particle size is about ⅕ to ⅟₁₀ of the particle size. In the following description of exemplary embodiments, a relationship between the larger particle size and the smaller particle size of the phosphor particles is the same as described above. The foregoing particle sizes are mere examples and are not limited to the values described above.

Wavelength conversion element 102 as the second wavelength conversion element according to the first exemplary embodiment illustrated in part (b) of FIG. 1 includes a three-layer phosphor region formed by stacking first phosphor region 121 including phosphor particle 121a, second phosphor region 122 including fluorescent light body particle 122a, and third phosphor region 123 including phosphor particle 123a with intervention of binders 124 such as silicon or the like. As illustrated in part (b) of FIG. 1, phosphor particles different in particle size are disposed in a thickness direction of the phosphor region. In this case, the particle size of phosphor particle 122a constituting second phosphor region 122 disposed in a middle is smaller than the particle size of phosphor particle 121a of first phosphor region 121 on a front side (upper side in part (b) of FIG. 1) and the particle size of phosphor particle 123a of third phosphor region 123 on a back side (lower side of part (b) of FIG. 1).

Phosphor particle 121a in first phosphor region 121 and phosphor particle 123a in third phosphor region 123 may be different or identical.

As illustrated in part (c) of FIG. 1, wavelength conversion elements 101, 102 have a ring shape. However, the shape of the phosphor ring may be a segment shape in which a ring is partially cut, or a polygonal shape such as a square.

[1-1-1-2. Configurations of Phosphor Wheels Including a Wavelength Conversion Element]

Figure 2:
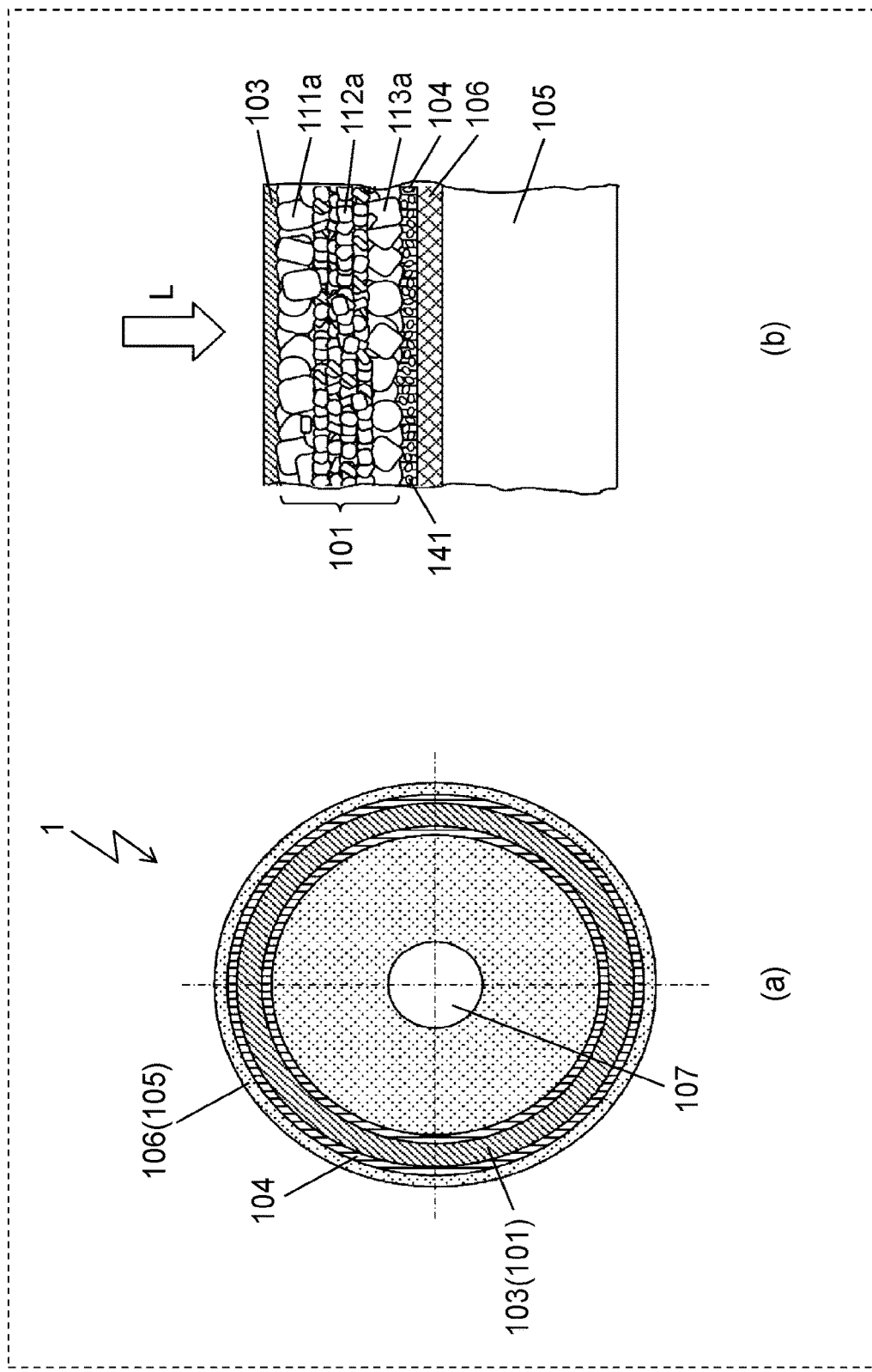
FIG. 2 is a diagram illustrating a configuration of a first phosphor wheel including a first wavelength conversion element in a ring shape according to the first exemplary embodiment.

FIG. 2 illustrates a configuration of a first phosphor wheel including the first wavelength conversion element according to the first exemplary embodiment. Part (a) of FIG. 2 is a plan view of the first phosphor wheel, and part (b) of FIG. 2 is a cross-sectional view of the first phosphor wheel.

Description will be given as to a case where a wavelength conversion element is formed as a phosphor ring as illustrated in part (c) of FIG. 1.

Phosphor wheel 1 as the first phosphor wheel has wavelength conversion element 101 that is ring-shaped and has antireflection coating 103 on a surface and base plate 105 that has reflection layer 106 on a surface. Silicon layer 104 filled with contained particle 141 to improve thermal conductivity and reflectance is provided between reflection layer 106 and wavelength conversion element 101 in a ring shape.

Wavelength conversion element 101 is formed from phosphor particles 111a, 112a, 113a different in particle size as described above. The particle sizes of the phosphor particles are different in the thickness direction of the phosphor region. In this case, the particle sizes of phosphor particle 111a on the front antireflection coating 103 side and phosphor particle 113a on the base plate 105 side are larger than the particle size of phosphor particle 112a in the middle as seen in the thickness direction. Base plate 105 of phosphor wheel 1 is provided with motor attachment hole 107.

Next, a configuration of the second phosphor wheel including the first wavelength conversion element according to the first exemplary embodiment will be described. In this case, unlike phosphor wheel 1 illustrated in FIG. 2, the phosphor wheel is formed in a segment shape by partially cutting the phosphor ring illustrated in part (c) of FIG. 1 as a cutout portion.

Figure 3:
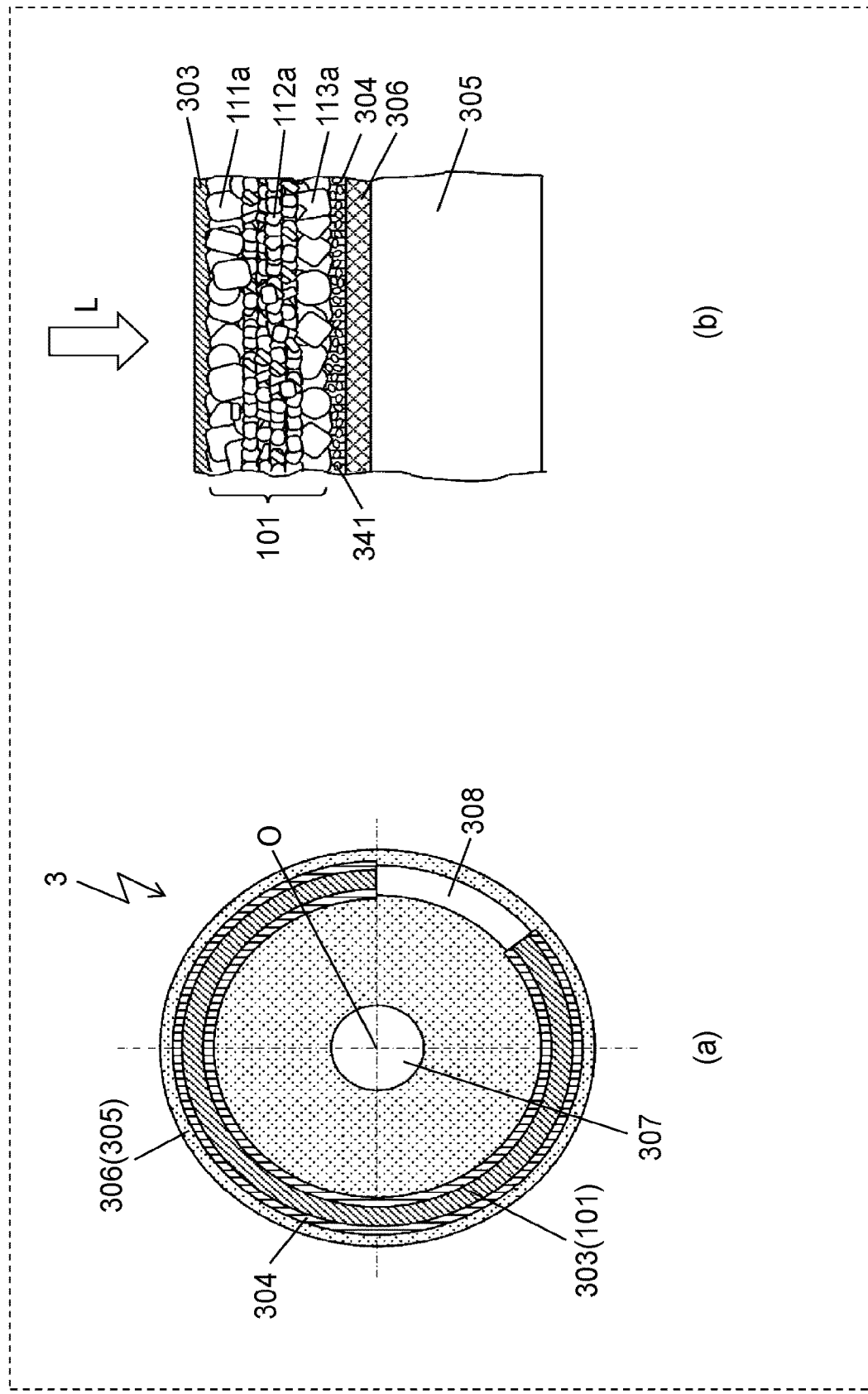
FIG. 3 is a diagram illustrating a configuration of a second phosphor wheel including the first wavelength conversion element in a segment shape according to the first exemplary embodiment.

FIG. 3 is a diagram illustrating a configuration of the second phosphor wheel including the first wavelength conversion element according to the first exemplary embodiment. Part (a) of FIG. 3 is a plan view of the second phosphor wheel, and part (b) of FIG. 3 is a cross-sectional view of second phosphor wheel 3.

Phosphor wheel 3 as the second phosphor wheel has wavelength conversion element 101 in a segment shape that is provided with antireflection coating 303 on a surface and has a cutout portion and base plate 305 that is provided with reflection layer 306 on a surface and has opening 308 corresponding to the cutout portion. Wavelength conversion element 101 in a segment shape and opening 308 are disposed at a same distance in a radial direction from rotation center O of phosphor wheel 3. Base plate 305 is provided with motor attachment hole 307. In addition, silicon layer 304 filled with contained particle 341 to improve thermal conductivity and reflectance is provided between reflection layer 306 and wavelength conversion element 101 in a segment shape.

Wavelength conversion element 101 is formed from phosphor particles 111a, 112a, 113a different in particle size as described above. The particle sizes of the phosphor particles are different in the thickness direction of the phosphor region. In this case, the particle sizes of phosphor particle 111a on the front antireflection coating 303 side and phosphor particle 113a on the base plate 305 side are larger than the particle size of phosphor particle 112a in the middle as seen in the thickness direction. In other words, in the wavelength conversion element, the particle size of phosphor particle 112a constituting the phosphor region in the middle is smaller than the particle sizes of phosphor particles 111a, 113a constituting the two other phosphor regions.

Figure 4:
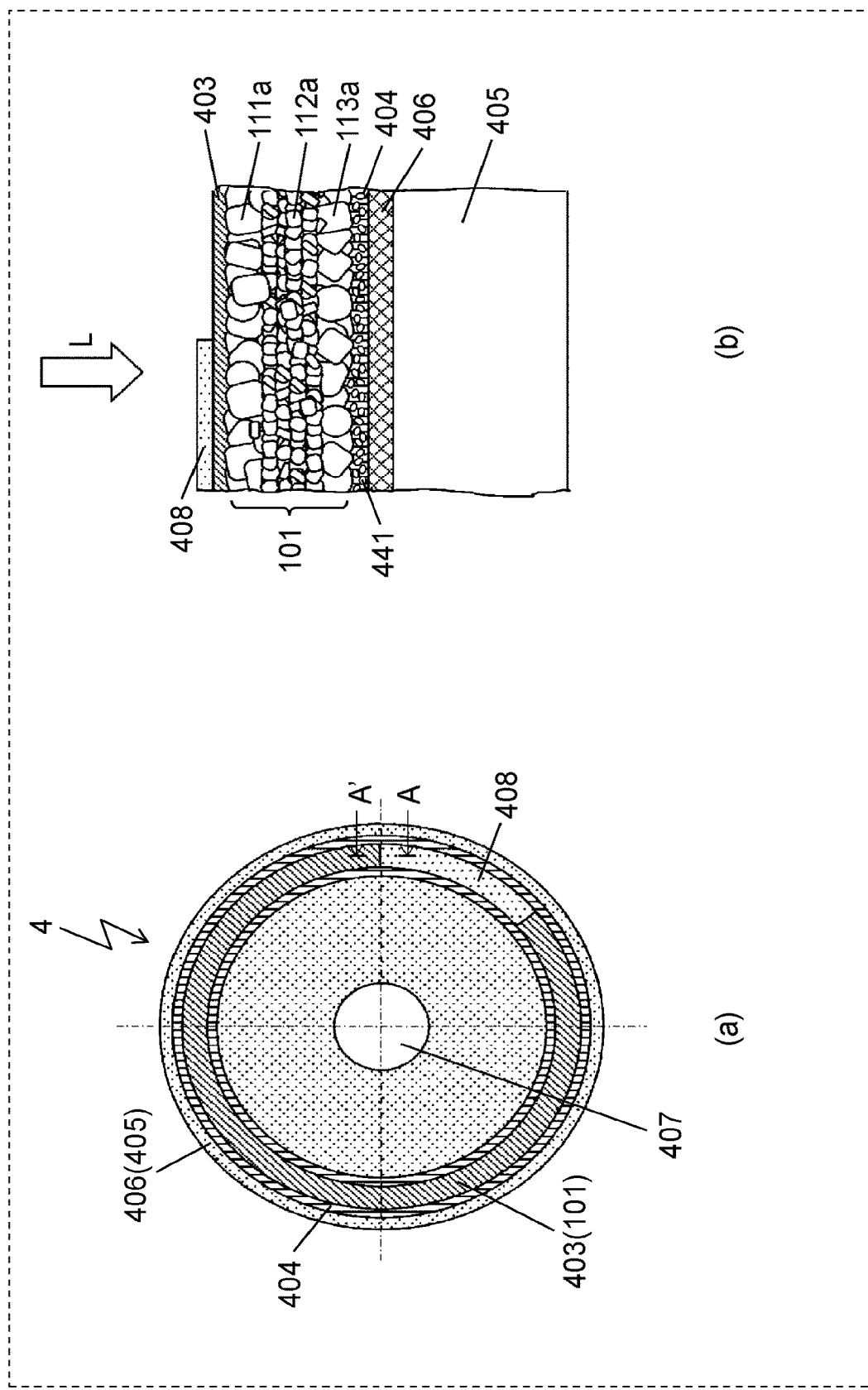
FIG. 4 is a diagram illustrating a configuration of a third phosphor wheel including the first wavelength conversion element in a ring shape according to the first exemplary embodiment.

Next, a third phosphor wheel including the first wavelength conversion element according to the first exemplary embodiment will be described. FIG. 4 is a diagram illustrating a configuration of the third phosphor wheel including the first wavelength conversion element according to the first exemplary embodiment. Part (a) of FIG. 4 is a plan view of the third phosphor wheel, and part (b) of FIG. 4 is a cross-sectional view of part (a) of FIG. 4 taken along line 4b-4b.

Phosphor wheel 4 as the third phosphor wheel has wavelength conversion element 101 that is provided with reflection coating 408 on a surface of a portion of the phosphor ring with antireflection coating 403 on a surface and base plate 405 that is provided with reflection layer 406 on a surface. Base plate 405 is provided with motor attachment hole 407. Silicon layer 404 filled with contained particle 441 to improve thermal conductivity and reflectance is provided between reflection layer 406 and wavelength conversion element 101.

Wavelength conversion element 101 is formed from phosphor particles 111a, 112a, 113a different in particle size as described above. The particle sizes of the phosphor particles are different in the thickness direction of the phosphor region. In this case, the particle sizes of phosphor particle 111a on the front antireflection coating 303 side and phosphor particle 113a on the base plate 305 side are larger than the particle size of phosphor particle 112a in the middle as seen in the thickness direction. In other words, in wavelength conversion element 101, the particle size of phosphor particle 112a constituting the phosphor region in the middle is smaller than the particle sizes of phosphor particles 111a, 113a constituting the two other phosphor regions.

In the phosphor wheels illustrated in FIGS. 3 and 4, one wavelength conversion element 101 is used. Alternatively, a plurality of wavelength conversion elements with different wavelength regions of fluorescent light to be converted may be used. In that case, wavelength conversion element 101 can be used as at least one of the plurality of wavelength conversion elements.

Phosphor wheels 3, 4 illustrated in FIGS. 3 and 4 have respectively one opening 308 and one reflection coating 408. Alternatively, the phosphor wheels may be formed with a plurality of openings and a plurality of reflection coatings.

Figure 5:
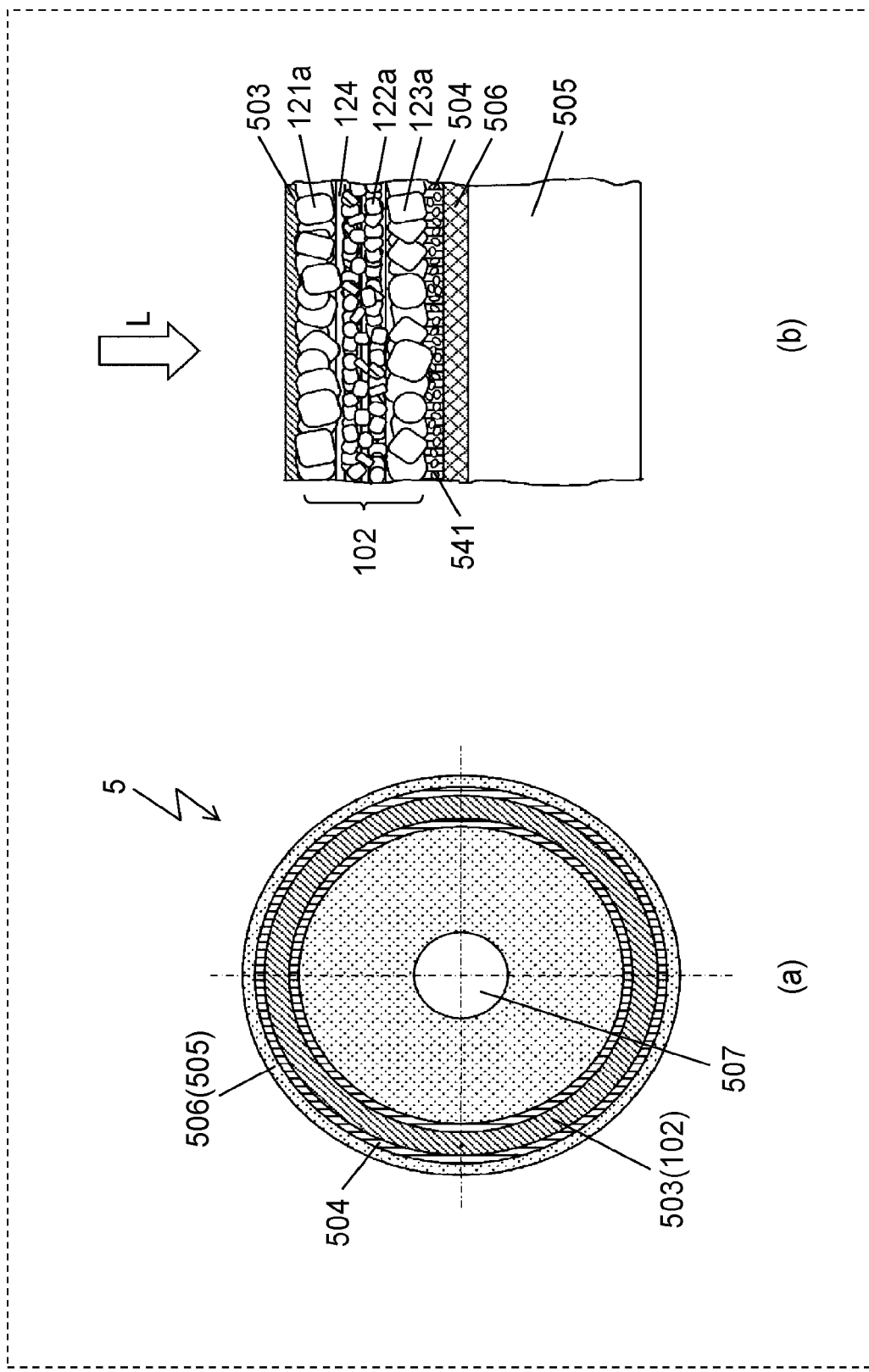
FIG. 5 is a diagram illustrating a configuration of a phosphor wheel including a second wavelength conversion element in a ring shape according to the first exemplary embodiment.

Next, a configuration of a phosphor wheel including the second wavelength conversion element according to the first exemplary embodiment will be described. FIG. 5 illustrates a configuration of the phosphor wheel including the second wavelength conversion element according to the first exemplary embodiment. Part (a) of FIG. 5 is a plan view of the phosphor wheel, and part (b) of FIG. 5 is a cross-sectional view of the phosphor wheel. Phosphor wheel 5 illustrated in FIG. 5 uses wavelength conversion element 102 illustrated in part (b) of FIG. 1 instead of wavelength conversion element 101 illustrated in part (a) of FIG. 1.

Phosphor wheel 5 has silicon layer 504 filled with contained particle 541 to improve thermal conductivity and reflectance between wavelength conversion element 102 with antireflection coating 503 on a surface and base plate 505 with reflection layer 506 on a surface. Base plate 505 is provided with motor attachment hole 507.

Wavelength conversion element 102 is formed from phosphor particles 121a, 122a, 123a different in particle size and binder 124 such as silicon as described above. The particle sizes of the phosphor particles are different in the thickness direction of the phosphor region. In this case, phosphor particle 121a on the front antireflection coating 503 side and phosphor particle 123a on the base plate 505 side are larger than phosphor particle 122a in the middle as seen in the thickness direction. In other words, in wavelength conversion element 102, the particle size of phosphor particle 122a constituting second phosphor region 122 in the middle is smaller than the particle sizes of phosphor particles 121a, 123a constituting the two other phosphor regions.

In the case of including wavelength conversion element 102 as in the case of including wavelength conversion element 101, the segment shape of phosphor wheel 3 illustrated in FIG. 3 may be adopted or a reflection coating may be provided on a surface of a portion of the phosphor ring as in phosphor wheel 4 illustrated in FIG. 4.

[1-1-2. Advantageous Effects and Others]

Figure 6:
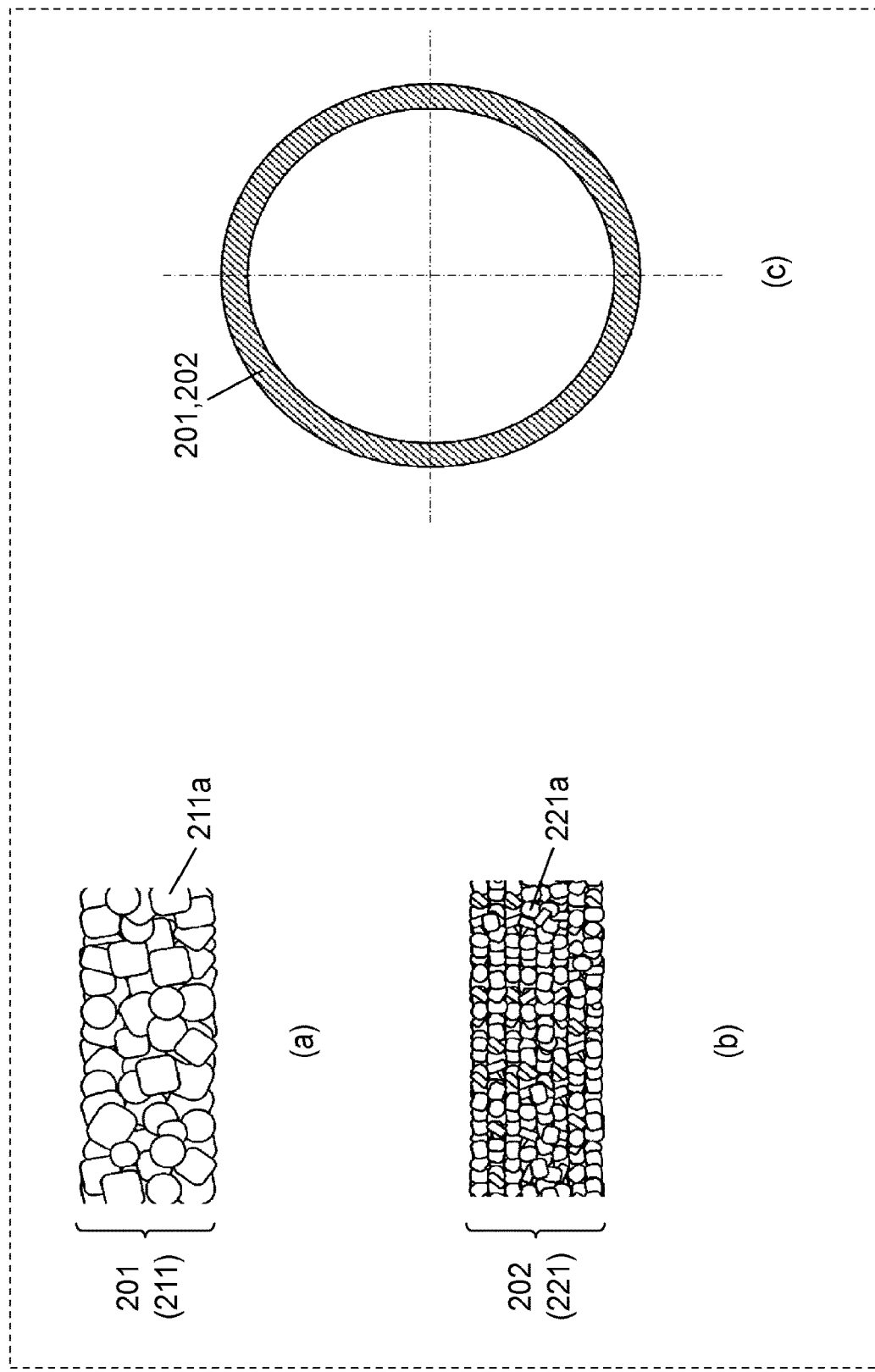
FIG. 6 is a diagram illustrating configurations of a wavelength conversion element according to a comparative example.

FIG. 6 is a configuration diagram of a wavelength conversion element according a comparative example of the present disclosure. Parts (a) and (b) of FIG. 6 is a cross-sectional view of the wavelength conversion element and part (c) of FIG. 6 is a plan view of the wavelength conversion element.

As illustrated in part (a) of FIG. 6, when wavelength conversion element 201 is formed from only phosphor region 211 including phosphor particle 211a with a larger particle size, wavelength conversion element 201 has the characteristics: (1) decreased surface reflection; (2) increased scattering property; and (3) increased thermal conductivity. In reverse, as illustrated in part (b) of FIG. 6, when wavelength conversion element 202 is formed from only phosphor region 221 including phosphor particle 221a with a smaller particle size, wavelength conversion element 202 has the characteristics: (1) increased surface reflection; (2) decreased scattering property; and (3) decreased thermal conductivity.

First, as for the surface reflection, excitation light absorbed in the phosphor increases with smaller surface reflection. Thus, the fluorescent light emitted by wavelength conversion increases in the phosphor with the same quantum efficiency. That is, the particle with a larger particle size is higher in the efficiency of conversion (fluorescent light efficiency) than the particle with a smaller particle size.

Next, as for the scattering property, the excitation light is guided through the phosphor particle, and is subjected to wavelength conversion and emitted as fluorescent light. Accordingly, even when the excitation light of the same spot size is entered, the size of light-emission spot is larger with larger particle size than with a smaller particle size. The larger the size of the light-emission spot is, the more the coupling efficiency in the light guidance system and the rod optical system in subsequent optical systems is lowered. That is, the coupling efficiency in the subsequent optical systems is lower with a larger particle size than with a smaller particle size.

Lastly, there exists a larger interfacial thermal resistance between adjacent particles than inside a particle. Accordingly, with the same thickness of the phosphor, the number of interfaces is smaller with a larger phosphor particle size than with a smaller phosphor particle size to decrease the heat resistance value, in other words, increase the thermal conductivity. The phosphor has a characteristic that the fluorescent light characteristic becomes lower with rise in the temperature. Accordingly, the conversion efficiency of the particle with a larger particle size increases as compared to the particle with a smaller particle size.

Summarizing the foregoing matter, in the case of the particle with a larger particle size, the absorption efficiency based on surface reflection is higher, the coupling efficiency based on the spot size is lower, and the conversion efficiency varying with the temperature is higher.

The efficiencies of the light source device and the projection display apparatus can be determined by the product of the foregoing three efficiencies (1) the absorption efficiency based on surface reflection, (2) the coupling efficiency based on spot size, and (3) the conversion efficiency varying with temperature.

As described above, when the particle size is large, (2) the coupling efficiency based on the spot size is lowered, and in contrast, when the particle size is small, (1) the absorption efficiency based on surface reflection and (3) the conversion efficiency varying with the temperature are lowered.

In this manner, when the phosphor region is formed from only the phosphor particle with a larger particle size or only the phosphor particle with a smaller particle size, the wavelength conversion element and the phosphor wheel, the light source device, and the projection display apparatus including the wavelength conversion device are configured in a state where any of the foregoing three efficiencies (1) to (3) is lowered.

Figure 7:
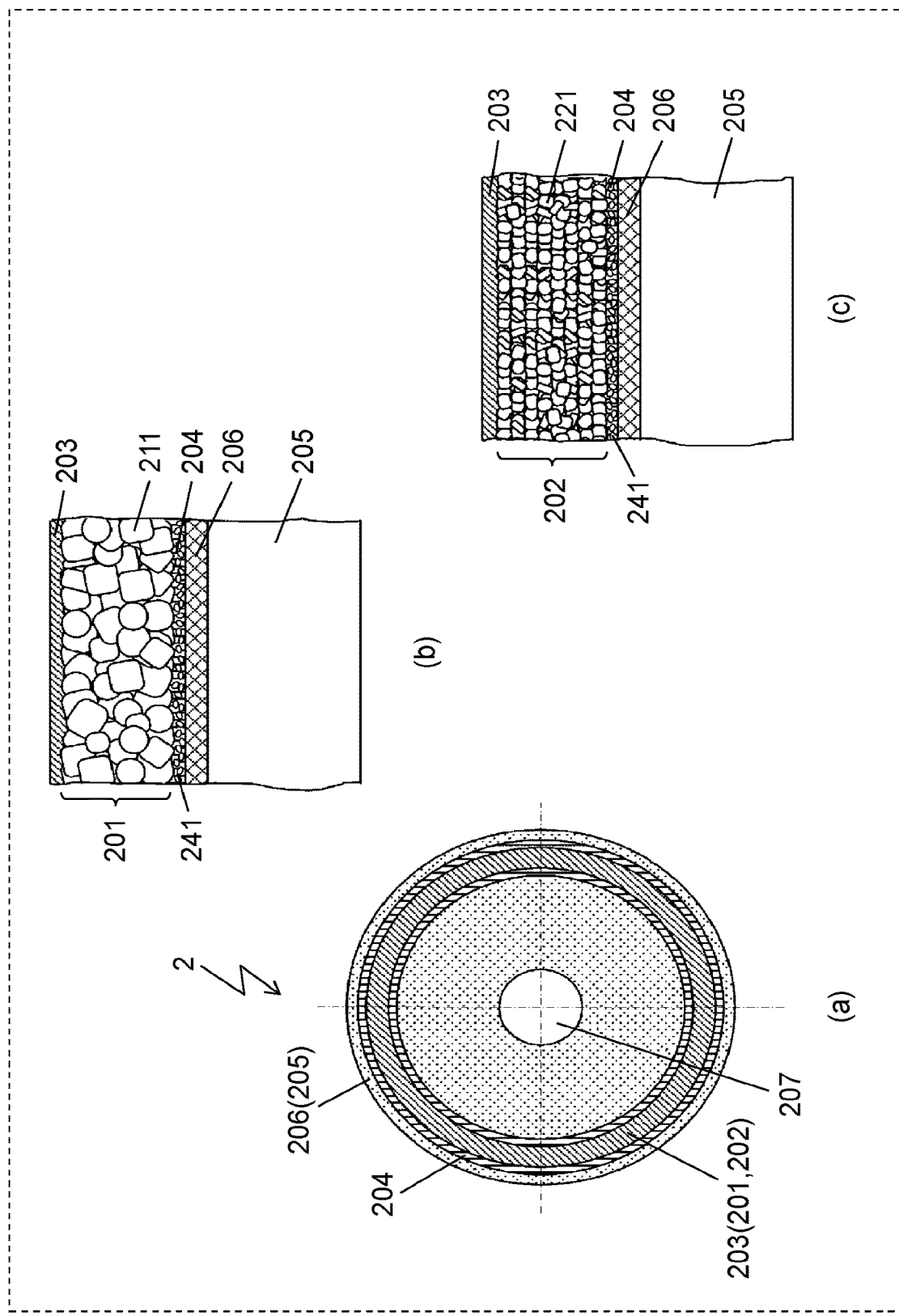
FIG. 7 is a diagram illustrating configurations of a first phosphor wheel including a wavelength conversion element in a ring shape according to the comparative example.

FIG. 7 is a diagram illustrating a configuration of phosphor wheel 2 including a phosphor ring including the wavelength conversion element according to the comparative example. Part (a) of FIG. 7 is a plan view of phosphor wheel 2, and parts (b) and (c) of FIG. 7 are cross-sectional views of phosphor wheel 2.

The advantageous effects of the present disclosure will be described with reference to phosphor wheel 1 illustrated in part (b) of FIG. 2 and phosphor wheel 2 illustrated in part (b) of FIG. 7. The functions of antireflection coating 203, silicon layer 204, base plate 205, reflection layer 206, and motor attachment hole 207 of phosphor wheel 2 illustrated in FIG. 7 are the same as those of phosphor wheel 1 illustrated in FIG. 2, and thus descriptions thereof will be omitted.

In phosphor wheel 1 illustrated in part (b) of FIG. 2, excitation light L as a blue laser is emitted from the antireflection coating 103 side provided on a surface of phosphor wheel 1. Excitation light L passes through antireflection coating 103, and at the incidence into wavelength conversion element 101, excitation light L enters from the surface of wavelength conversion element 101 into phosphor particles 111a, 112a, 113a in this order to excite the phosphor particles and emit fluorescent light. The excitation light having not been absorbed in phosphor particles 111a, 112a, 113a reaches an adhesion layer formed from silicon layer 104 and provided on the base plate 105 side of wavelength conversion element 101, is reflected on contained particle 141 with high reflectance in the adhesion layer or reflection layer 106 under the adhesion layer, and is changed in a travel direction toward wavelength conversion element 101. The excitation light having been reflected on reflection layer 106 and entered into wavelength conversion element 101 then is entered into phosphor particles 113a, 112a, and 111a in this order and is converted into fluorescent light.

It is known that the efficiency of absorbing the excitation light into the wavelength conversion element (hereinafter, called "absorption efficiency") depends on the filling rate of the phosphor particle and the particle size of the phosphor particle. The filling rate of the phosphor particle can be optimized to the maximum regardless of the particle size and thus the absorption efficiency depends on the particle size of the phosphor particle. For example, in the case of a wavelength conversion element formed from phosphor particles of different particle sizes as illustrated in parts (a) and (b) of FIG. 6, wavelength conversion element 201 illustrated in part (a) of FIG. 6 formed from the phosphor particle with a larger particle size is higher in absorption efficiency than wavelength conversion element 202 illustrated in part (b) of FIG. 6 formed from the phosphor particles with a smaller particle size. In the case of phosphor wheel 1 including wavelength conversion element 101 of which the cross section is illustrated in part (b) of FIG. 2, increasing phosphor particle 111a on the incident side of the excitation light achieves high absorption efficiency.

The light converted from excitation light to fluorescent light is emitted from phosphor particles 111a, 112a, 113a in all directions. A portion of the fluorescent light emitted to the side opposite to base plate 105 is absorbed in phosphor particles 111a, 112a, 113a and is converted into heat, and the other portion passes through antireflection coating 103 and is emitted.

On the other hand, the fluorescent light emitted to the base plate 105 side reflects on the adhesion layer in silicon layer 104 containing contained particle 141 with high reflectance or reflection layer 106 provided on the wavelength conversion element 101 side of base plate 105, and is changed in the travel direction and emitted to the side opposite to base plate 105. A portion of the fluorescent light emitted to the side opposite to base plate 105 is absorbed in phosphor particles 111a, 112a, 113a and is converted into heat, and the remaining light passes through antireflection coating 103 and is emitted.

At this time, the fluorescent light of which wavelength has been converted by phosphor particles 111a, 112a, 113a is emitted from particle outer surfaces of phosphor particles 111a, 112a, 113a. In the case of phosphor particles of different particle sizes as illustrated in parts (a) and (b) of FIG. 6, wavelength conversion element 201 illustrated in part (a) of FIG. 6 formed from the phosphor particle with a larger particle size is larger in emission spot of fluorescent light than wavelength conversion element 202 illustrated in part (b) of FIG. 6 formed from the phosphor particles with a smaller particle size. The coupling efficiency of in the subsequent optical systems (hereinafter, called "coupling efficiency") varies depending on the size of the fluorescent light spot. When the maximum fluorescent light spot capable of being taken in the subsequent optical systems is exceeded, the coupling efficiency becomes lower as the fluorescent light spot is larger. Accordingly, the optimization of the coupling efficiency requires decreasing the particle size of the phosphor particle. In phosphor wheel 1 including first wavelength conversion element 101 of which the cross section is illustrated in part (b) of FIG. 2, arranging phosphor particle 112a with a smaller particle size in the middle as seen in the thickness direction greatly affecting on the spot size achieves high coupling efficiency.

The heat not converted into fluorescent light by the phosphor particles is conducted to the surroundings via the phosphor particles. The phosphor has a characteristic called thermal quenching that, as the temperature rises, fluorescent light converted into from the excitation light decreases. That is, the phosphor has a characteristic that the conversion efficiency is higher at a lower temperature. As illustrated in part (a) of FIG. 2, conducting heat to base plate 105 with the largest surface area in phosphor wheel 1 can reduce the temperature of wavelength conversion element 101. To do that, it is necessary to increase the thermal conductivity of wavelength conversion element 101 in the thickness direction, in other words, reduce heat resistance. In this case, the interface resistance generated on the interface between the phosphor particles has the highest heat resistance value in the wavelength conversion element. Accordingly, decreasing the interface between the particles lowers the heat resistance value in the wavelength conversion element. Specifically, taking the comparative example, wavelength conversion element 201 illustrated in part (a) of FIG. 6 formed from the phosphor particle with a larger particle size is lower in heat resistance value than wavelength conversion element 202 illustrated in part (b) of FIG. 6 formed from the phosphor particle with a smaller particle size. In the case of phosphor wheel 1 including wavelength conversion element 101 of which the cross section is illustrated in part (b) of FIG. 2, by increasing the size of phosphor particle 113a on the base plate side in the thickness direction greatly affecting on the heat resistance value decreases the heat resistance value, it is possible to lower the temperature of wavelength conversion element 101 and reduce the influence of temperature quenching, thereby improving fluorescent light efficiency.

As described above, phosphor wheel 1 including wavelength conversion element 101 of which the cross section is illustrated in part (b) of FIG. 2 can be improved in the absorption efficiency, the coupling efficiency, and the fluorescent light efficiency by increasing the particle size of phosphor particle 111a on the surface side, reducing the particle size of phosphor particle 112a in the middle, increasing the particle size of phosphor particle 113a on the base plate side in the thickness direction of wavelength conversion element 101, thereby maximizing the efficiency of the phosphor wheel determined by the absorption efficiency×the coupling efficiency×the fluorescent light efficiency.

In phosphor wheels 3 and 4 including wavelength conversion element 101 respectively illustrated in FIGS. 3 and 4, as in phosphor wheel 1 illustrated in FIG. 2, the absorption efficiency is improved by phosphor particle 111a with a larger particle size from the surface of wavelength conversion element 101, the coupling efficiency is improved by phosphor particle 112a with a smaller particle size in the middle, and the fluorescent light efficiency is improved by lowering temperature rise by phosphor particle 113a with a larger particle size on the base plate side. Accordingly, the efficiency of the phosphor wheel determined by the absorption efficiency×the coupling efficiency×the fluorescent light efficiency can be maximized.

In phosphor wheel 5 including wavelength conversion element 102 illustrated in FIG. 5, as in the phosphor wheel including wavelength conversion element 101, the absorption efficiency is improved by phosphor particle 121a with a larger particle size from the surface of wavelength conversion element 102, the coupling efficiency is improved by phosphor particle 122a in the middle, and the fluorescent light efficiency is improved by lowering temperature rise by phosphor particle 123a on the base plate side. Accordingly, the efficiency of the phosphor wheel determined by the absorption efficiency×the coupling efficiency×the fluorescent light efficiency can be maximized.

As described above, configuring the wavelength conversion element as in the present embodiment makes it possible to improve (1) the absorption efficiency based on surface reflection, (2) the coupling efficiency based on spot size, and (3) conversion efficiency varying with the temperature, which determine the characteristics of the wavelength conversion element, thereby achieving the wavelength conversion element with improved efficiency.

[1-2. Light Source Devices Including the Phosphor Wheel]

Configurations of light source devices including the phosphor wheel with the wavelength conversion element according to the first exemplary embodiment will be described.

Figure 11:
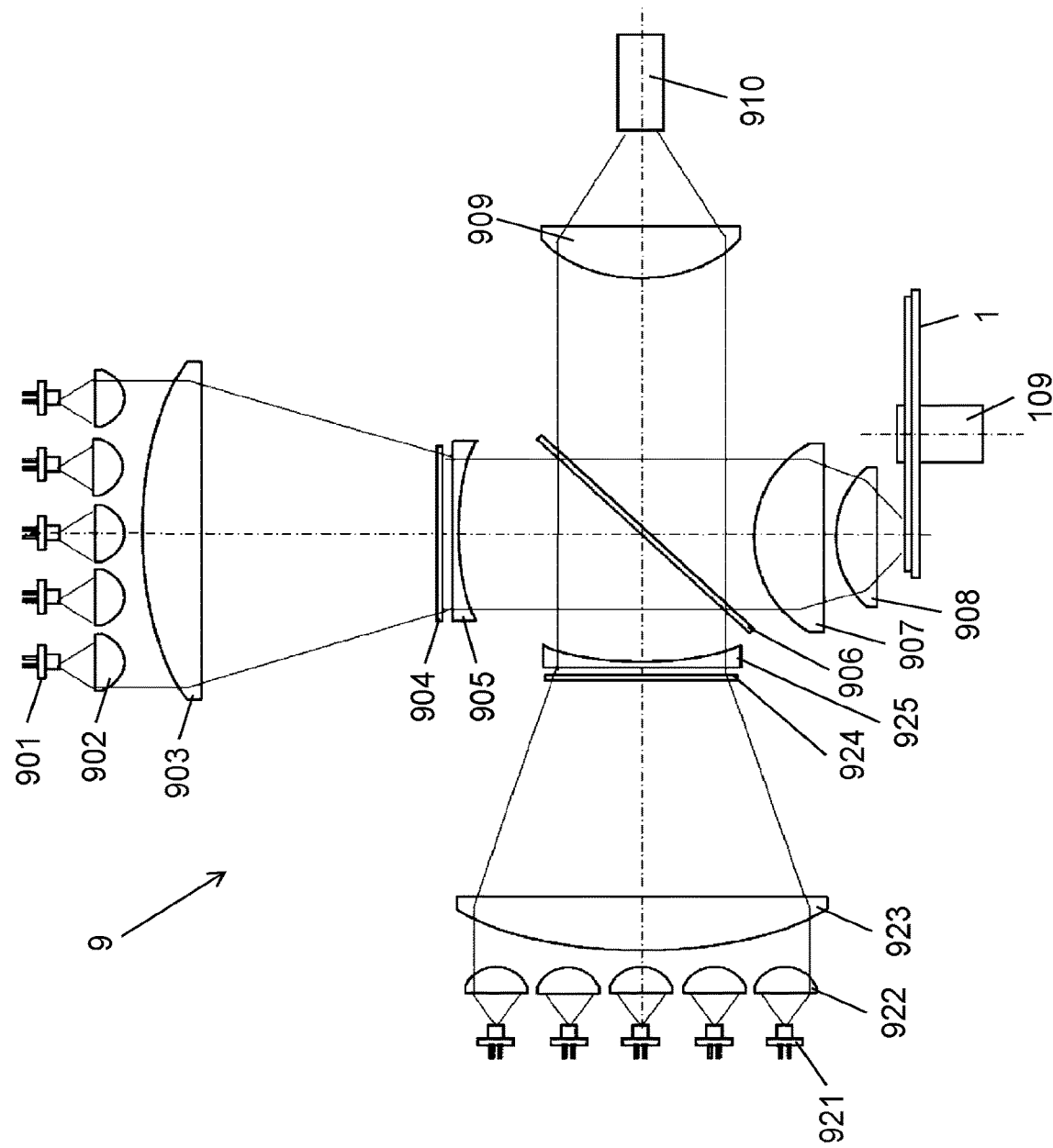
FIG. 11 is a diagram illustrating a configuration of a first light source device including the first phosphor wheel according to the first exemplary embodiment.

FIG. 11 illustrates the first light source device as light source device 9 including the first phosphor wheel with the wavelength conversion element in a ring shape. Hereinafter, light source device 9 will be described with reference to phosphor wheel 1 with wavelength conversion element 101 illustrated in FIG. 2.

Laser light in a wavelength region of blue light emitted from a plurality of laser light sources 901 is collimated by a plurality of collimator lenses 902 corresponding to laser light sources 901. The collimated blue light is entered into convex lens 903, decreased in light flux width, and entered into diffuser plate 904 where the blue light is diffused and improved in light uniformity. The blue light with improved light uniformity is entered into concave lens 905 and is turned into parallel light flux.

The blue light parallelized by concave lens 905 is entered into dichroic mirror 906 positioned about 45 degrees with respect to an optical axis, and is entered into convex lens 907 without a change in the travel direction of light. Dichroic mirror 906 has a spectral characteristic of transmitting the light in the wavelength region of blue light emitted from laser light sources 901 and laser light sources 921 and reflecting the light in the wavelength region of fluorescent light of which wavelength has been converted by phosphor wheel 1 with the blue light from laser light sources 901 as excitation light.

In this case, dichroic mirror 906 has the spectral characteristic focusing on the wavelength characteristics of the blue light from the laser light sources and the fluorescent light of which wavelength has been converted. Alternatively, by paying attention to the polarization direction of the laser light source, the polarization direction of the blue light from the laser light sources may be adjusted to the same direction so that dichroic mirror 906 has spectral characteristics focusing on the wavelength characteristics of the fluorescent light having converted wavelength through the wavelength region of the blue light from the laser light sources and the light in the polarization direction.

The blue light entered into convex lens 907 is then entered by combination with convex lens 908 into wavelength conversion element 101 in the ring shape provided in phosphor wheel 1. Phosphor wheel 1 has motor 109. The blue excitation light is collected by convex lenses 907 and 908 around a rotation shaft of motor 109 and is entered into wavelength conversion element 101 in the ring shape.

The blue light collected by convex lenses 907 and 908 on wavelength conversion element 101 of phosphor wheel 1 is converted to wavelength into fluorescent light, changed in the travel direction by 180 degrees, and entered again into convex lenses 908 and 907 in this order and turned into parallel light. In this case, the wavelength region of the fluorescent light subjected to wavelength conversion is optimized such the fluorescent light is combined with the blue light emitted from laser light sources 921 described later to form white light, for example.

The fluorescent light emitted from convex lens 907 and turned into parallel light is entered into dichroic mirror 906 from the opposite direction. Dichroic mirror 906 has the characteristic of reflecting the light in the wavelength region of fluorescent light as described above and thus changes the direction of the light by 90 degrees.

The fluorescent light changed in the travel direction by 90 degrees by dichroic mirror 906 is entered into convex lens 909.

Laser light in the wavelength region of blue light emitted from the plurality of laser light sources 921 is collimated by a plurality of collimator lenses 922 corresponding to laser light sources 921. The collimated blue light is entered into convex lens 923, decreased in light flux width, entered into diffuser plate 924 where the blue light is diffused and improved in light uniformity. The blue light with improved light uniformity is entered into concave lens 925 and is turned into parallel light flux.

The blue light parallelized by concave lens 925 is entered into dichroic mirror 906 that has a characteristic of transmitting the light in the wavelength region of blue light emitted from laser light sources 921 and is positioned about 45 degrees with respect to the optical axis, and is entered into convex lens 909 without a change in the travel direction of light.

The fluorescent light entered from phosphor wheel 1 into convex lens 909 and the blue light from laser light sources 921 are collected and entered into rod integrator 910 that has an entry end arranged around a light collection position of convex lens 909. The light of flux uniformed by the rod integrator is emitted from an emission end of the rod integrator.

In the exemplary embodiment illustrated in FIG. 11, dichroic mirror 906 is arranged at an angle of approximately 45 degrees with respect to the optical axis. Alternatively, to maximize the spectral characteristics, dichroic mirror 906 with respect to the optical axis may have an angle different from approximate 45 degrees. In that case, other components may be arranged to that angle.

Dichroic mirror 906 has been described as having a characteristic of transmitting the light in the wavelength region of blue light and reflecting the light in the wavelength region of fluorescent light with reference to FIG. 11. Alternatively, dichroic mirror 906 may have a characteristic of reflecting the light in the wavelength region of blue light and transmitting the light in the wavelength region of fluorescent light, and the arrangement of other components may be optimized as appropriate.

The laser light from laser light sources 901 may not be light in the wavelength region of blue light but may be light in the ultraviolet region. In that case, the characteristics of dichroic mirror 906 and the arrangement of the other components may be optimized according to the wavelength region of the laser light from laser light sources 901.

Figure 13:
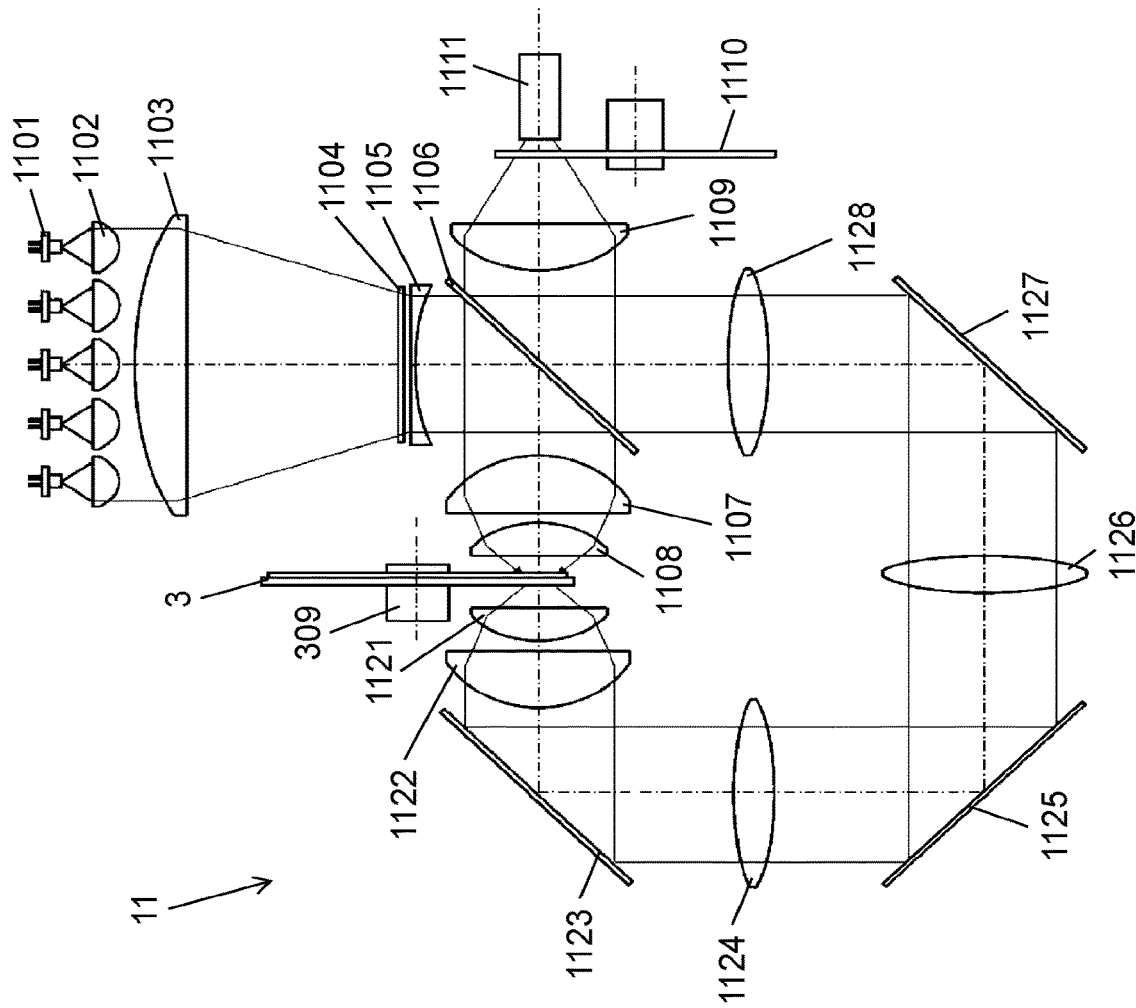
FIG. 13 is a diagram illustrating a configuration of a second light source device including the second phosphor wheel according to the first exemplary embodiment.

FIG. 13 illustrates the second light source device as light source device 11 using the second phosphor wheel with the wavelength conversion element in a segment shape. Hereinafter, light source device 11 will be described with reference to phosphor wheel 3 with wavelength conversion element 101 illustrated in FIG. 3.

Laser light in the wavelength region of blue light emitted from a plurality of laser light sources 1101 is collimated by a plurality of collimator lenses 1102 corresponding to laser light sources 1101. The collimated blue light is entered into convex lens 1103, decreased in light flux width, entered into diffuser plate 1104 where the blue light is diffused and improved in light uniformity. The blue light with improved light uniformity is entered into concave lens 1105 and is turned into parallel light flux.

The blue light parallelized by concave lens 1105 is entered into dichroic mirror 1106 positioned about 45 degrees with respect to an optical axis, and is changed by 90 degrees in the travel direction of light and entered into convex lens 1107. Dichroic mirror 1106 has a spectral characteristic of reflecting the light in the wavelength region of blue light emitted from laser light sources 1101 and transmitting the light in the wavelength region of fluorescent light of which wavelength has been converted by phosphor wheel 3 with the blue light from laser light sources 1101 as excitation light.

In this case, dichroic mirror 1106 has the spectral characteristic focusing on the wavelength characteristics of the blue light from the laser light sources and the fluorescent light of which wavelength has been converted. Alternatively, by paying attention to the polarization direction of the laser light source, the polarization direction of the blue light from the laser light sources may be adjusted to the same direction so that dichroic mirror 906 has spectral characteristics focusing on the wavelength characteristics of the fluorescent light having wavelength conversion through the wavelength region of the blue light from the laser light sources and the light in the polarization direction.

The blue light entered into convex lens 1107 is then entered by combination with convex lens 1108 into wavelength conversion element 101 in the partially cut ring shape provided in phosphor wheel 3. Phosphor wheel 3 has motor 309. The blue excitation light is collected by convex lenses 1107, 1108 around a rotation shaft of motor 309 and is entered into a radius region where wavelength conversion element 101 in the segment shape a segment shape with a cutout portion in which a ring shape is partially cut, and opening 308 are arranged.

The blue light collected by convex lenses 1107, 1108 on wavelength conversion element 101 of phosphor wheel 3 is subjected to wavelength conversion into fluorescent light, changed in the travel direction by 180 degrees, and entered again into convex lenses 1108, 1107 in this order and turned into parallel light. In this case, the wavelength region of the fluorescent light subjected to wavelength conversion is optimized such that fluorescent light is combined with the blue light emitted from laser light sources 1101 to form white light, for example.

The fluorescent light emitted from convex lens 1107 and turned into parallel light is entered again into dichroic mirror 1106. Dichroic mirror 1106 has the characteristic of transmitting the light in the wavelength region of fluorescent light as described above and thus transmits the light without a change in the direction of the light.

Then, the blue light from laser light sources 1101 collected by opening 308 of phosphor wheel 3 passes through phosphor wheel 3 and then is turned into parallel light by convex lenses 1121, 1122. After that, the light is guided by a relay lens system including three reflection mirrors 1123, 1125, 1127 and three convex lenses 1124, 1126, 1128 to clichroic mirror 1106 in such a manner that the light is parallelized and entered into clichroic mirror 1106 from the direction opposite to the direction in which the light from laser light sources 1101 is entered. In this case, the relay optical system is formed from the three mirrors and the three convex lenses but may be differently configured as far as it delivers the same performance.

The blue light entered from convex lens 1128 into clichroic mirror 1106 is reflected with a 90-degree change in the travel direction of light.

According to the foregoing configuration, the fluorescent light and the blue light combined by dichroic mirror 1106 is time-sequential and entered into convex lens 1109.

The time-sequential fluorescent light and blue light entered from dichroic mirror 1106 into convex lens 1109 are collected by convex lens 1109 and entered into color filter wheel 1110. Color filter wheel 1110 is synchronized with phosphor wheel 3 by a synchronization circuit not illustrated and is formed from a plurality of filters that has a characteristic of transmitting the blue light and part of the fluorescent light or the light in all the wavelength regions.

While yellow fluorescent light is emitted from phosphor wheel 3, for example, color filter wheel 1110 rotates in synchronization, having at least one of a region in which light in the wavelength region of fluorescent light is directly transmitted, a region in which a red portion of fluorescent light is reflected and a green portion of fluorescent light is transmitted, and a region in which a green portion of fluorescent light is reflected and a red portion of fluorescent light is transmitted. The blue light having passed through opening 308 of phosphor wheel 3 is handled by the region in which the light in the wavelength region of fluorescent light is transmitted so that color light different in light wavelength region is collected in a time-sequential manner in the vicinity of the entry end of rod integrator 1111.

The light entered into rod integrator 1111 is uniformed by the rod integrator and the uniformed light is emitted from the emission end of rod integrator 1111.

In the present embodiment, color filter wheel 1110 is positioned at the incident side of rod integrator 1111. Alternatively, color filter wheel 1110 may be positioned at the emission side of rod integrator 1111.

Figure 15:
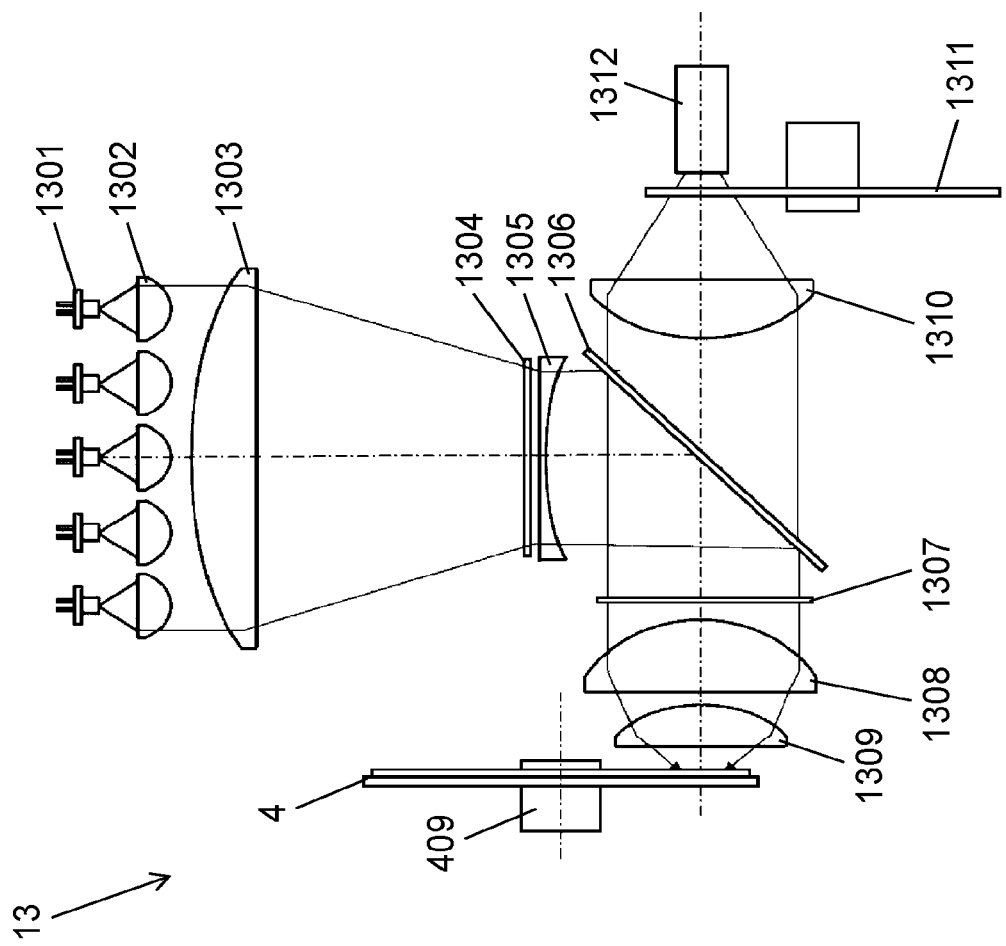
FIG. 15 is a diagram illustrating a configuration of a third light source device including the third phosphor wheel according to the first exemplary embodiment.

FIG. 15 illustrates the third light source device as light source device 13 including the third phosphor wheel with the wavelength conversion element in a ring shape. Hereinafter, light source device 13 will be described with reference to phosphor wheel 4 with wavelength conversion element 101 illustrated in FIG. 4.

Laser light in the wavelength region of blue light emitted from a plurality of laser light sources 1301 is collimated by a plurality of collimator lenses 1302 corresponding to laser light sources 1301. The collimated blue light is entered into convex lens 1303, decreased in light flux width, entered into diffuser plate 1304 where the blue light is diffused and improved in light uniformity. The blue light with improved light uniformity is entered into concave lens 1305 and is turned into parallel light flux.

The laser light is adjusted by the optical system to concave lens 1305 such that, when being emitted from concave lens 1305, the light is S-polarized with respect to polarized and dichroic mirror 1306 in the subsequent stage. Polarized and dichroic mirror 1306 has a polarization characteristic and a spectral characteristic.

The blue light parallelized by concave lens 1305 is entered into polarized and dichroic mirror 1306 positioned about 45 degrees with respect to an optical axis, and is changed by 90 degrees in the travel direction of light and entered into λ/4 wavelength plate 1307. Polarized and dichroic mirror 1306 has a polarization and spectral characteristic of reflecting the S-polarized light in the wavelength region of blue light emitted from laser light sources 1301 and transmitting the light in the wavelength region of fluorescent light of which wavelength has been converted by phosphor wheel 4 described later with the blue light from laser light sources 1301 as excitation light. λ/4 wavelength plate 1307 turns the polarization direction of the entered blue light from laser light sources 1301 and changes the light into circularly polarized light.

The light emitted from λ/4 wavelength plate 1307 is entered into convex lens 1308, and then entered by combination with convex lens 1309 into wavelength conversion element 101 with reflection coating 408 on the surface of a portion of the ring provided in phosphor wheel 4. Phosphor wheel 4 has motor 409. The blue excitation light is collected by convex lenses 1308, 1309 around a rotation shaft of motor 409 and is entered into a radius region where wavelength conversion element 101 in the ring shape and reflection coating 408 are arranged.

First, the blue light collected by convex lenses 1308, 1309 on wavelength conversion element 101 of phosphor wheel 4 is subjected to wavelength conversion into fluorescent light, changed in the travel direction by 180 degrees, and entered again into convex lenses 1309, 1308 in this order and turned into parallel light. In this case, the wavelength region of the fluorescent light subjected to wavelength conversion is optimized such that fluorescent light is combined with the blue light emitted from laser light sources 1301 to form white light, for example.

The fluorescent light emitted from convex lens 1308 and turned into parallel light passes through λ/4 wavelength plate 1307 and is entered again into polarized and dichroic mirror 1306 arranged at an angle of 45 degrees with respect to an optical axis. Polarized and dichroic mirror 1306 has the characteristic of transmitting the light in the wavelength region of fluorescent light as described above and thus transmits the light having passed through λ/4 wavelength plate 1307 without a change in the direction of light. Next, the blue light from laser light sources 1301 collected by reflection coating 408 of phosphor wheel 4 is reflected on phosphor wheel 4, changed in travel direction by 180 degrees, and entered into convex lenses 1309, 1308 and parallelized there.

The blue light parallelized by convex lenses 1309, 1308 is entered into λ/4 wavelength plate 1307, and turned in polarization direction and converted into P-polarized light.

The P-polarized blue light emitted from λ/4 wavelength plate 1307 is entered into polarized and dichroic mirror 1306 arranged at an angle of 45 degrees with respect to the optical axis. Polarized and dichroic mirror 1306 has a polarization and spectral characteristic of reflecting the S-polarized light in the wavelength region of blue light emitted from laser light sources 1301 and transmitting the P-polarized light in the wavelength region of blue light and the light in the wavelength region of fluorescent light of which wavelength has been converted by phosphor wheel 4. Accordingly, the P-polarized blue light emitted from λ/4 wavelength plate 1307 is entered into convex lens 1310.

The fluorescent light and the blue light are entered in a time-sequential manner into convex lens 1310 according to the rotation of phosphor wheel 4 and is collected and entered into color filter wheel 1311. Color filter wheel 1311 is synchronized with phosphor wheel 4 by a synchronization circuit not illustrated and is formed from a plurality of filters that has a characteristic of transmitting the blue light and part of the fluorescent light or the light in all the wavelength regions.

While yellow fluorescent light is emitted from phosphor wheel 4, for example, color filter wheel 1311 rotates in synchronization, having at least one of a region in which light in the wavelength region of fluorescent light is directly transmitted, a region in which a red portion of fluorescent light is reflected and a green portion of fluorescent light is transmitted, and a region in which a green portion of fluorescent light is reflected and a red portion of fluorescent light is transmitted. The blue light reflected by reflection coating 408 of phosphor wheel 4 is handled by the region of color filter wheel 1311 in which the light in the wavelength region of fluorescent light is transmitted so that color light different in light wavelength region is collected in a time-sequential manner in the vicinity of the entry end of rod integrator 1312. The light entered into rod integrator 1312 is uniformed by the rod integrator and the uniformed light is emitted from the emission end.

In the present embodiment, color filter wheel 1311 is disposed in front of rod integrator 1312. Alternatively, color filter wheel 1311 may be disposed after emission end of rod integrator 1312.

[1-2-2. Advantageous Effects and Others]

In light source device 9, wavelength conversion element 101 is used in phosphor wheel 1. Accordingly, the efficiency of absorption into the phosphor becomes maximized by phosphor particle 111a with a larger particle size provided on the incident side of the blue light from laser light sources 901, and the coupling efficiency becomes maximized by phosphor particle 112a with a smaller particle size positioned in the middle of the phosphor region as seen in the thickness direction, and lastly thermal conductivity is improved and thermal quenching is reduced by phosphor particle 113a with a larger particle size on the side of the phosphor region closest to the base plate 105 to maximize the fluorescent light efficiency. Accordingly, it is possible to maximize the efficiency represented by the absorption efficiency×the coupling efficiency×the fluorescent light efficiency.

In light source devices 11, 13 as well, wavelength conversion element 101 is used in respective phosphor wheels 3, 4 to maximize the efficiency in the same manner as in light source device 9.

Also in the case of forming the first to third light source devices using the first to third phosphor wheels with wavelength conversion element 102, it is possible to maximize the efficiency represented by the absorption efficiency×the coupling efficiency×the fluorescent light efficiency as in the same manner as in light source devices 9, 11, 13 as the first to third light source devices with wavelength conversion element 101.

[1-3-1. Projection Display Apparatuses Including a Light Source Device]

A configuration of projection display apparatus 10 including the first light source device having the first phosphor wheel with wavelength conversion element 101 in the ring shape will be described.

Figure 12:
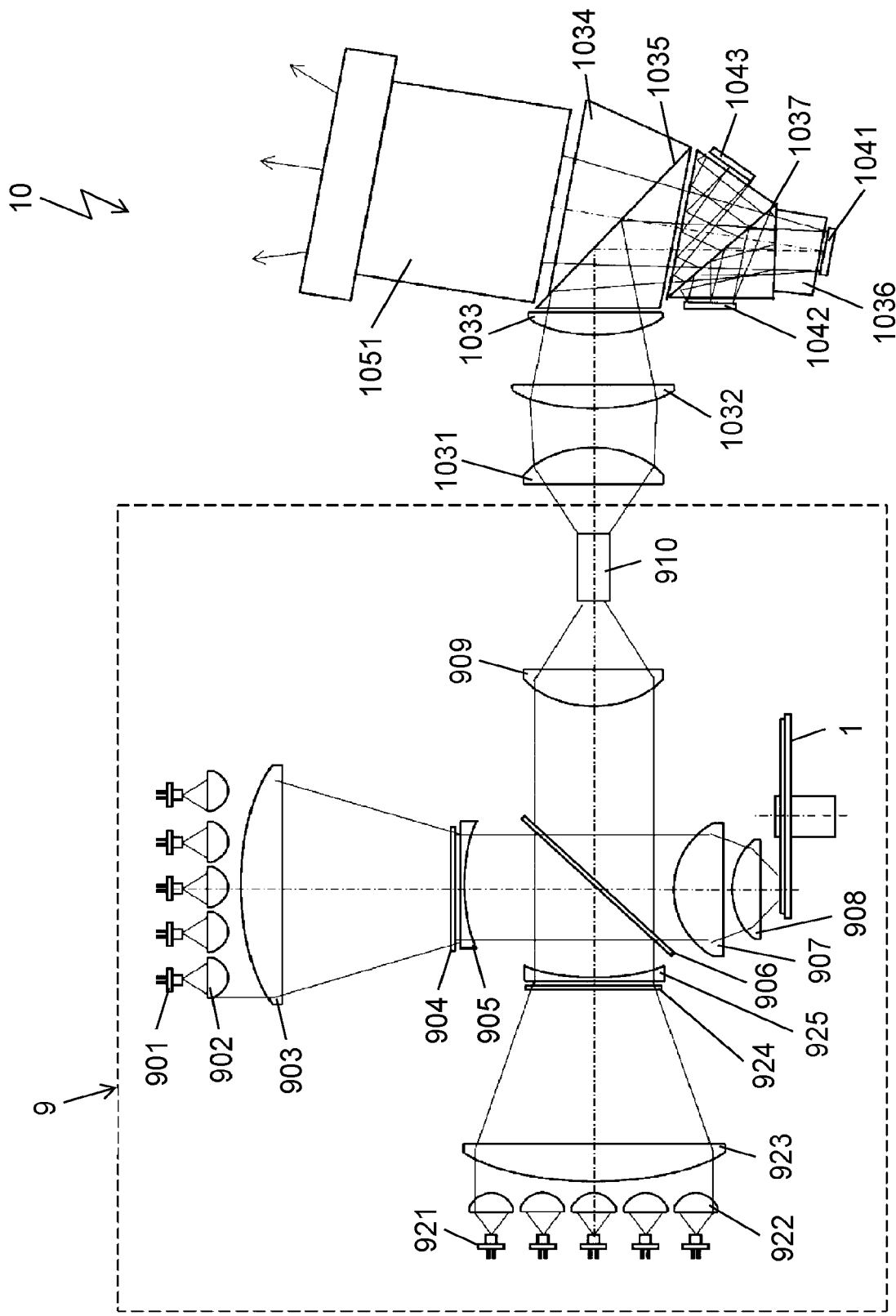
FIG. 12 is a diagram illustrating a configuration of a projection display apparatus including the first light source device according to the first exemplary embodiment.

FIG. 12 illustrates a configuration of projection display apparatus 10 including light source device 9 as the first light source device.

Light source device 9 including phosphor wheel 1 with wavelength conversion element 101 in the ring shape has been described above and thus description of light source device 9 will be omitted.

Light emission end of rod integrator 910 is mapped to digital micromirror devices (DMDs) 1041, 1042, 1043 by a relay lens system formed from convex lenses 1031, 1032, 1033.

The light emitted from the relay lens system formed form convex lenses 1031, 1032, 1033 is entered into total internal reflection prism 1034 with narrow gap 1035. The light emitted from the relay lens system and entered into total internal reflection prism 1034 at an angle equal to or larger than a total reflection angle is reflected on narrow gap 1035, changed in travel direction, and entered into color prism 1036 formed from three glass blocks with narrow gap 1037.

Blue light and fluorescent light entered from total internal reflection prism 1034 into a first glass block of color prism 1036, the blue light is first reflected on a spectral characteristic reflection coating provided in front of narrow gap 1037 and having a characteristic of reflecting blue light, then is changed in travel direction, travels to the total internal reflection prism, is entered into narrow gap between total internal reflection prism 1034 and color prism 1036 at an angle equal to or larger than the total reflection angle, and is entered into DMD 1043 to display video images of blue color.

Subsequently, red light of the fluorescent light having passed through the narrow gap is reflected on a spectral characteristic reflection coating that is provided between the second and third glass blocks of color prism 1036 and has a spectral characteristic of reflecting light in the wavelength region of red color and transmitting green light, and is changed in the travel direction toward the first glass block.

The red light changed in the travel direction is reflected again on narrow gap 1037 between the first and second glass blocks of color prism 1036, changed in the travel direction of light, and is entered into DMD 1042 for red color.

In addition, green light of the fluorescent light having passed through narrow gap 1037 passes through a spectral characteristic reflection coating that is provided between the second and third glass blocks of the color prism and has a spectral characteristic of reflecting light in the wavelength region of red color and transmitting green light, travels to the third glass block, and is entered into DMD 1041 for green color.

DMDs 1041, 1042, 1043 change the orientations of the mirrors for each pixel according to video signals of respective colors from a video circuit not illustrated, thereby to change the travel direction of light.

First, the green light changed in the travel direction of light according to the video signal by DMD 1041 for green color is entered into the third glass block of color prism 1036, and passes through the spectral characteristic reflection coating provided between the third and second glass blocks of color prism 1036.

Subsequently, the red light changed in the travel direction of light according to the video signal by DMD 1042 for red color is entered into the second glass block of color prism 1036, and is entered into narrow gap 1037 between the second and first glass blocks of color prism 1036 at an angle equal to or larger than the total reflection angle and reflected. After that, the red light is changed in the travel direction of light toward the third glass block of the color prism, reflected on the spectral characteristic reflection coating provided between the second and third glass blocks of color prism 1036, changed in the travel direction of light, and combined with the green light.

The light combined by the spectral characteristic reflection coating travels to the first glass block of color prism 1036, and is entered into narrow gap 1037 between the second and first glass blocks of color prism 1036 at an angle smaller than the total reflection angle and transmitted.

Further, the blue light having changed in the travel direction according to the video signal in DMD 1043 for blue color is entered into the first glass block of color prism 1036, travels to total internal reflection prism 1034, and is entered into a gap between total internal reflection prism 1034 and color prism 1036 at an angle equal to or larger than the total reflection angle and travels toward the second glass block of color prism 1036. After that, the blue light is reflected on the dichroic mirror provided on the first glass block side in front of narrow gap 1037 provided between the first and second glass blocks of color prism 1036, changed in the travel direction toward total internal reflection prism 1034, is combined with light from green DMD 1041 and red DMD 1042, and is entered into total internal reflection prism 1034.

The light entered from DMDs 1041, 1042, 1043 into total internal reflection prism 1034 is entered into narrow gap 1035 in total internal reflection prism 1034 at an angle smaller than the total reflection angle and transmitted, entered into projection lens 1051, and projected onto a screen not illustrated.

Figure 14:
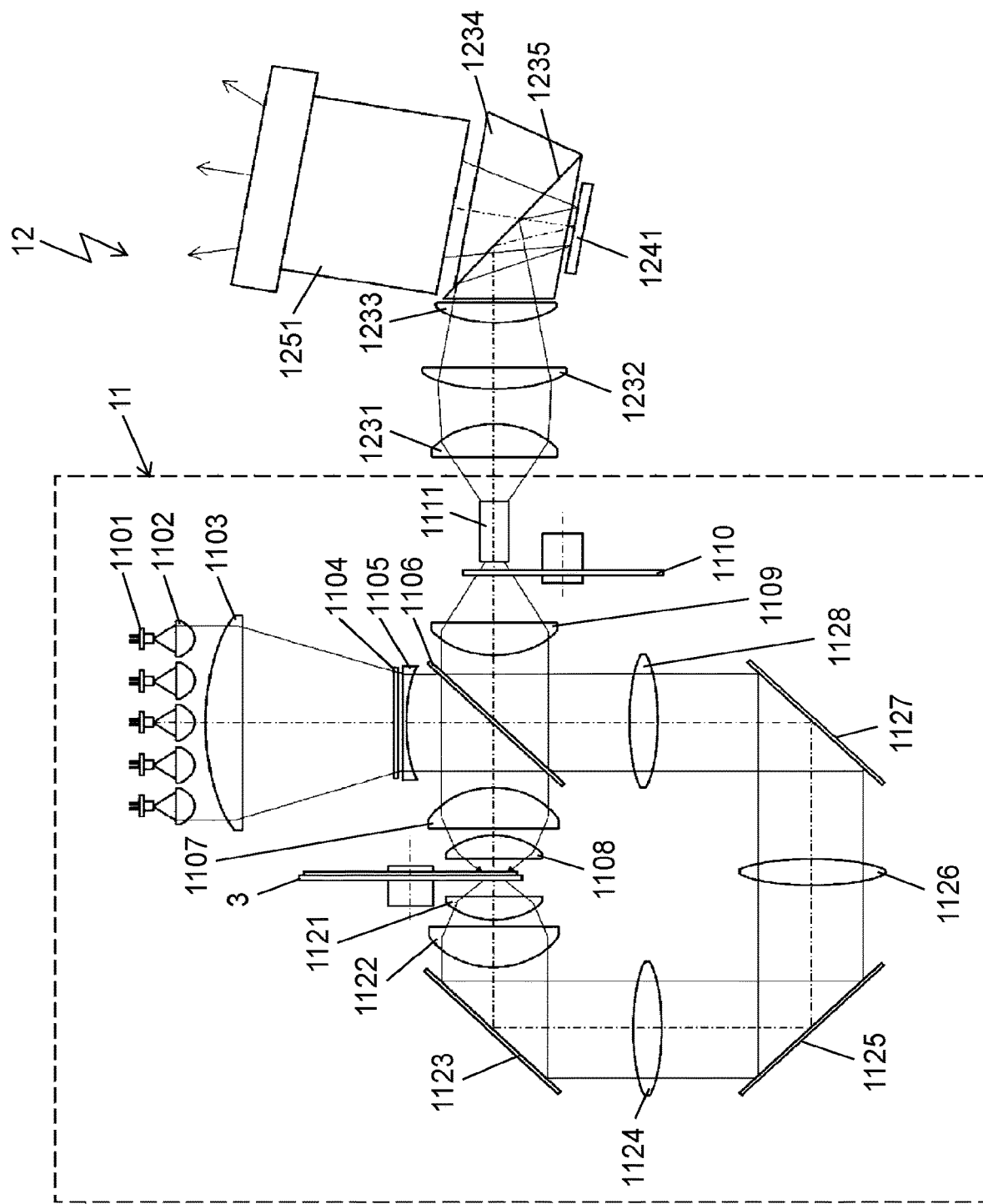
FIG. 14 is a diagram illustrating a configuration of a projection display apparatus including the second light source device according to the first exemplary embodiment.

FIG. 14 illustrates a configuration of projection display apparatus 12 including light source device 11 as the second light source device.

Light source device 11 including phosphor wheel 2 with wavelength conversion element 101 in the segment shape has been described above and thus description of light source device 11 will be omitted.

Light emission end of rod integrator 1111 is mapped to DMD 1241 described later by a relay lens system formed from convex lenses 1231, 1232, 1233.

The light transmitted from convex lenses 1231, 1232, 1233 and entered into total internal reflection prism 1234 is entered into narrow gap 1235 of total internal reflection prism 1234 at an angle equal to or larger than the total reflection angle, reflected and moved in the travel direction of light, and entered into DMD 1241.

DMD 1241 emits light with a change in the travel direction of light by changing the orientation of the micro mirror according to a signal from a video circuit not illustrated in synchronization with color light emitted from a combination of phosphor wheel 3 and color filter wheel 1110.

The light changed in the travel direction of light by DMD 1241 according to the video signal is entered into total internal reflection prism 1234, entered into narrow gap 1235 in total internal reflection prism 1234 at an angle smaller than the total reflection angle and transmitted, entered into projection lens 1251, and projected onto a screen not illustrated.

Figure 16:
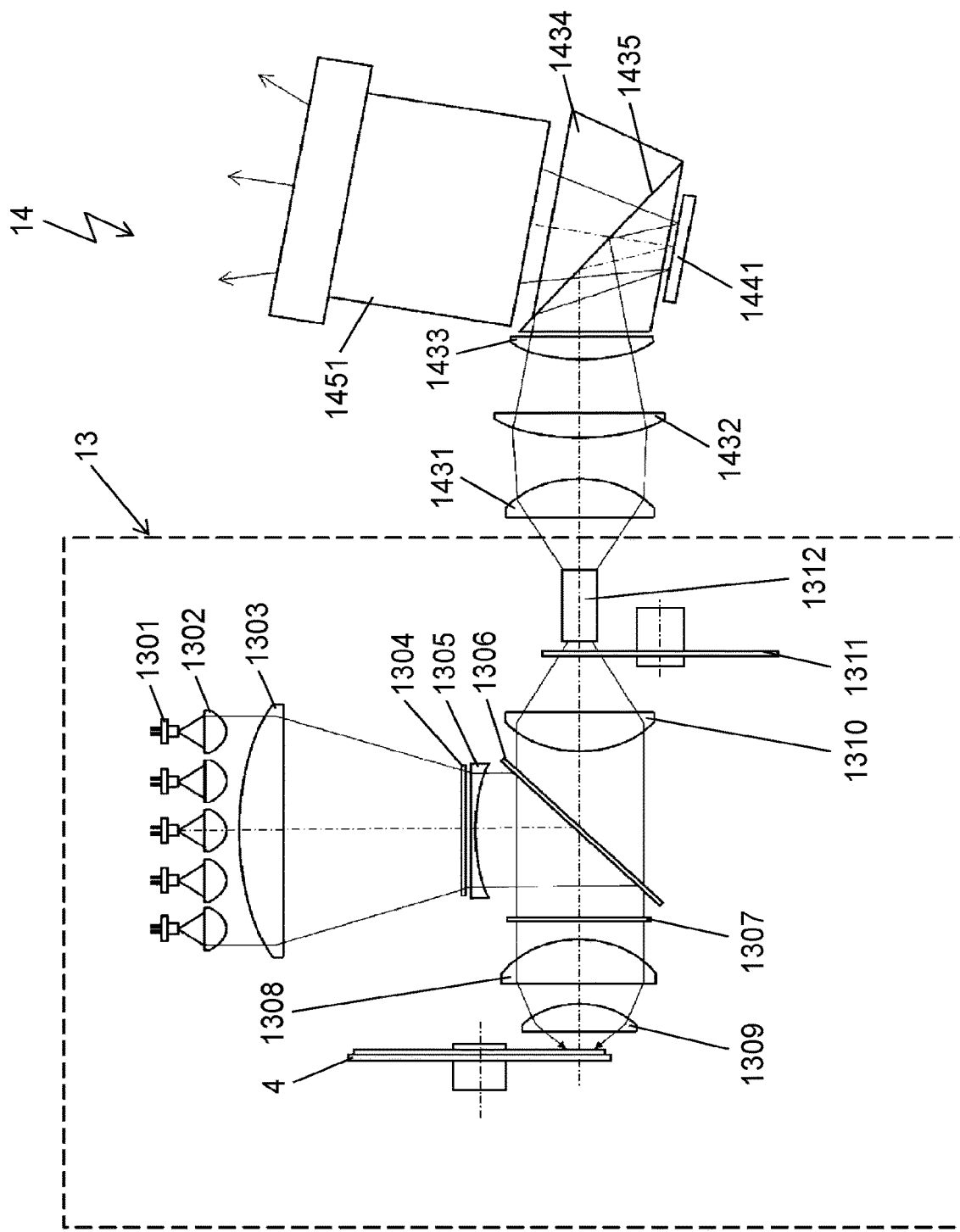
FIG. 16 is a diagram illustrating a configuration of a projection display apparatus including the third light source device according to the first exemplary embodiment.

FIG. 16 illustrates a configuration of projection display apparatus 14 including light source device 13 as the third light source device.

Light source device 13 including phosphor wheel 3 with reflection coating 408 on the surface having wavelength conversion element 101 in the ring shape has been described above and thus description of light source device 13 will be omitted.

Light emission end of rod integrator 1312 is mapped to DMD 1441 described later by a relay lens system formed from convex lenses 1431, 1432, 1433.

The light transmitted from convex lenses 1431, 1432, 1433 and entered into total internal reflection prism 1434 is entered into narrow gap 1435 of total internal reflection prism 1434 at an angle equal to or larger than the total reflection angle, reflected and moved in the travel direction of light, and entered into DMD 1441.

DMD 1441 emits light with a change in the travel direction of light by changing the orientation of the micro mirror according to a signal from a video circuit not illustrated in synchronization with color light emitted from a combination of phosphor wheel 4 and color filter wheel 1311.

The light changed in the travel direction of light by DMD 1441 according to the video signal is entered into total internal reflection prism 1434, entered into narrow gap 1435 in total internal reflection prism 1434 at an angle smaller than the total reflection angle and transmitted, entered into projection lens 1451, and projected onto a screen not illustrated.

[1-3-2. Advantageous Effects and Others]

In projection display apparatus 10 including light source device 9, wavelength conversion element 101 is used in phosphor wheel 1. Accordingly, the absorption efficiency becomes maximized by phosphor particle 111$a$ with a larger particle size provided on the incident side of the blue light from laser light sources 901, and the coupling efficiency becomes maximized by phosphor particle 112$a$ with a smaller particle size positioned in the middle of the phosphor region as seen in the thickness direction, and lastly thermal conductivity is improved and thermal quenching is reduced by phosphor particle 113$a$ with a larger particle size on the side of the phosphor region closest to the base plate 105 to maximize the fluorescent light efficiency. Accordingly, it is possible to maximize the efficiency represented by the absorption efficiency×the coupling efficiency×the fluorescent light efficiency.

In projection display apparatuses 12, 14 including light source devices 11, 13 as well, wavelength conversion element 101 is used in respective phosphor wheels 2, 3 to maximize the efficiency in the same manner as in projection display apparatus 10.

Second Exemplary Embodiment

[2-1-1-1. Configurations of Wavelength Conversion Elements]

Figure 8:
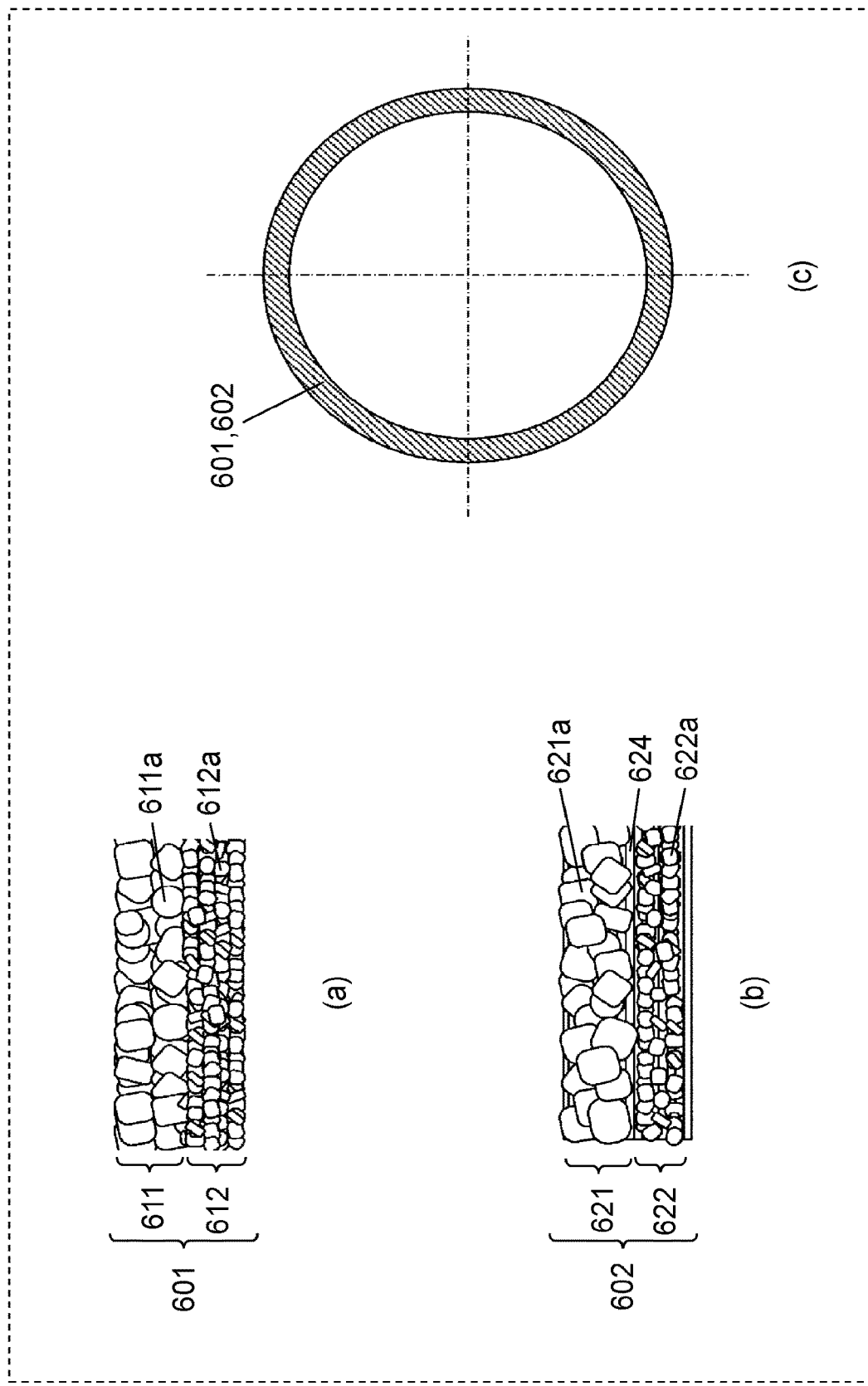
FIG. 8 is a diagram illustrating configurations of a wavelength conversion element according to a second exemplary embodiment.

Hereinafter, configurations of wavelength conversion elements according to a second exemplary embodiment will be described in detail. FIG. 8 is a configuration diagram of the wavelength conversion element according to the second exemplary embodiment. Part (a) of FIG. 8 is a cross-sectional view of a first wavelength conversion element according to the second exemplary embodiment, part (b) of FIG. 8 is a cross-sectional view of a second wavelength conversion element according to the second exemplary embodiment, and part (c) of FIG. 8 is a plan view of the wavelength conversion element.

As illustrated in part (a) of FIG. 8, wavelength conversion element 601 as the first wavelength conversion element according to the second exemplary embodiment includes a phosphor region of two layers formed by stacking first phosphor region 611 including phosphor particle 611$a$ and second phosphor region 612 including phosphor particle 612$a$. As illustrated in part (a) of FIG. 8, phosphor particles different in particle size are disposed in a thickness direction of the phosphor region. In this case, the particle size of phosphor particle 611$a$ on a front side (upper side in part (a) of FIG. 8) is larger than the particle size of phosphor particle 612$a$ on a back side (lower side of part (a) of FIG. 8).

As illustrated in part (b) of FIG. 8, wavelength conversion element 602 as the second wavelength conversion element according to the second exemplary embodiment is formed as first phosphor region 621 and second phosphor region 622 by filling phosphor particles 621$a$, 622$a$ different in particle size into binder 624 such as silicon, for example. As illustrated in FIG. 8, as in the case of wavelength conversion element 601, phosphor particles different in particle size are disposed in a thickness direction of the phosphor region. In this case, the particle size of phosphor particle 621$a$ on a front side (upper side in part (b) of FIG. 8) is larger than the particle size of phosphor particle 622$a$ on a back side (lower side of part (b) of FIG. 8).

Part (c) of FIG. 8 is a plane view of a phosphor ring produced by using wavelength conversion elements 601, 602. In this case, the wavelength conversion element is provided in the ring shape for the sake of description, but the wavelength conversion element may have a segment shape in which a ring is partially cut or a polygonal shape such as a square.

[2-1-1-2. Configurations of Phosphor Wheels Including a Wavelength Conversion Element]

Hereinafter, configurations of phosphor wheels will be described with reference to the phosphor rings formed from wavelength conversion elements 601, 602 illustrated in part (c) of FIG. 8.

Figure 9:
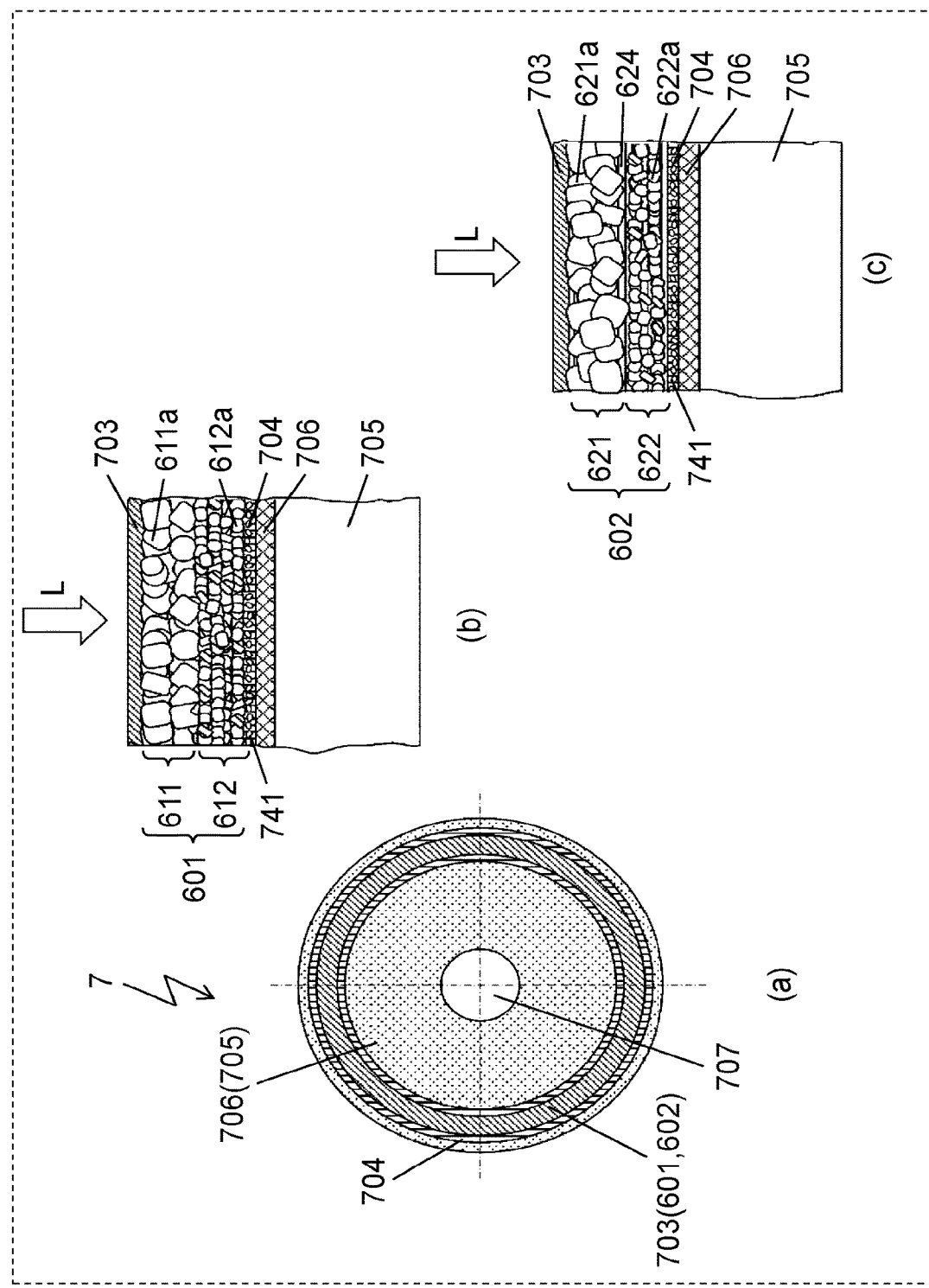
FIG. 9 is a diagram illustrating configurations of first and second phosphor wheels including respectively first and second wavelength conversion elements in a ring shape according to the second exemplary embodiment.

FIG. 9 illustrates first and second phosphor wheels including wavelength conversion elements 601, 602 according to the second exemplary embodiment. Part (a) of FIG. 9 is a plan view of the first and second phosphor wheels including wavelength conversion elements 601, 602, part (b) of FIG. 9 is a cross-sectional view of the first phosphor wheel including wavelength conversion element 601, and part (c) of FIG. 9 is a cross-sectional view of the second phosphor wheel including wavelength conversion element 602.

In phosphor wheel 7 as the first phosphor wheel including wavelength conversion element 601 illustrated in FIG. 9, a first phosphor region 611 side formed from phosphor particle 611$a$ with a larger particle size is positioned at an incident side of excitation light L. Similarly, in phosphor wheel 7 as the second phosphor wheel including wavelength conversion element 602, a first phosphor region 621 side formed from phosphor particle 621a with a larger particle size is positioned at an incident side of excitation light L.

First, phosphor wheel 7 including wavelength conversion element 601 will be described with reference to parts (a) and (b) of FIG. 9. As illustrated in part (b) of FIG. 9, phosphor wheel 7 has a phosphor ring including wavelength conversion element 601 with antireflection coating 703 on a surface and base plate 705 with reflection layer 706 on a surface, and silicon layer 704 filled with contained particle 741 to improve thermal conductivity and reflectance is provided between reflection layer 706 and the phosphor ring. Base plate 705 is provided with motor attachment hole 707.

Wavelength conversion element 601 as a phosphor ring is formed from phosphor particles 611a, 612a different in particle size as described above. The particle sizes of the phosphor particles are different in the thickness direction of the phosphor region. In this case, phosphor particle 611a on the front side is larger in particle size than phosphor particle 612a on the base plate 705 side.

Next, a configuration of phosphor wheel 7 including wavelength conversion element 602 will be described with reference to parts (a) and (c) of FIG. 9.

As illustrated in part (c) of FIG. 9, phosphor wheel 7 has a phosphor ring including wavelength conversion element 602 with antireflection coating 703 on a surface and base plate 705 with reflection layer 706 on a surface, and silicon layer 704 filled with contained particle 741 to improve thermal conductivity and reflectance is provided between reflection layer 706 and the phosphor ring.

Wavelength conversion element 602 formed as a phosphor ring includes phosphor particles 621a, 622a different in particle size and binder 624 made of silicon, for example. The particle sizes of the phosphor particles are different in the thickness direction of the phosphor region. In this case, phosphor particle 621a on the front side is larger in particle size than phosphor particle 622a on the base plate 705 side.

Figure 10:
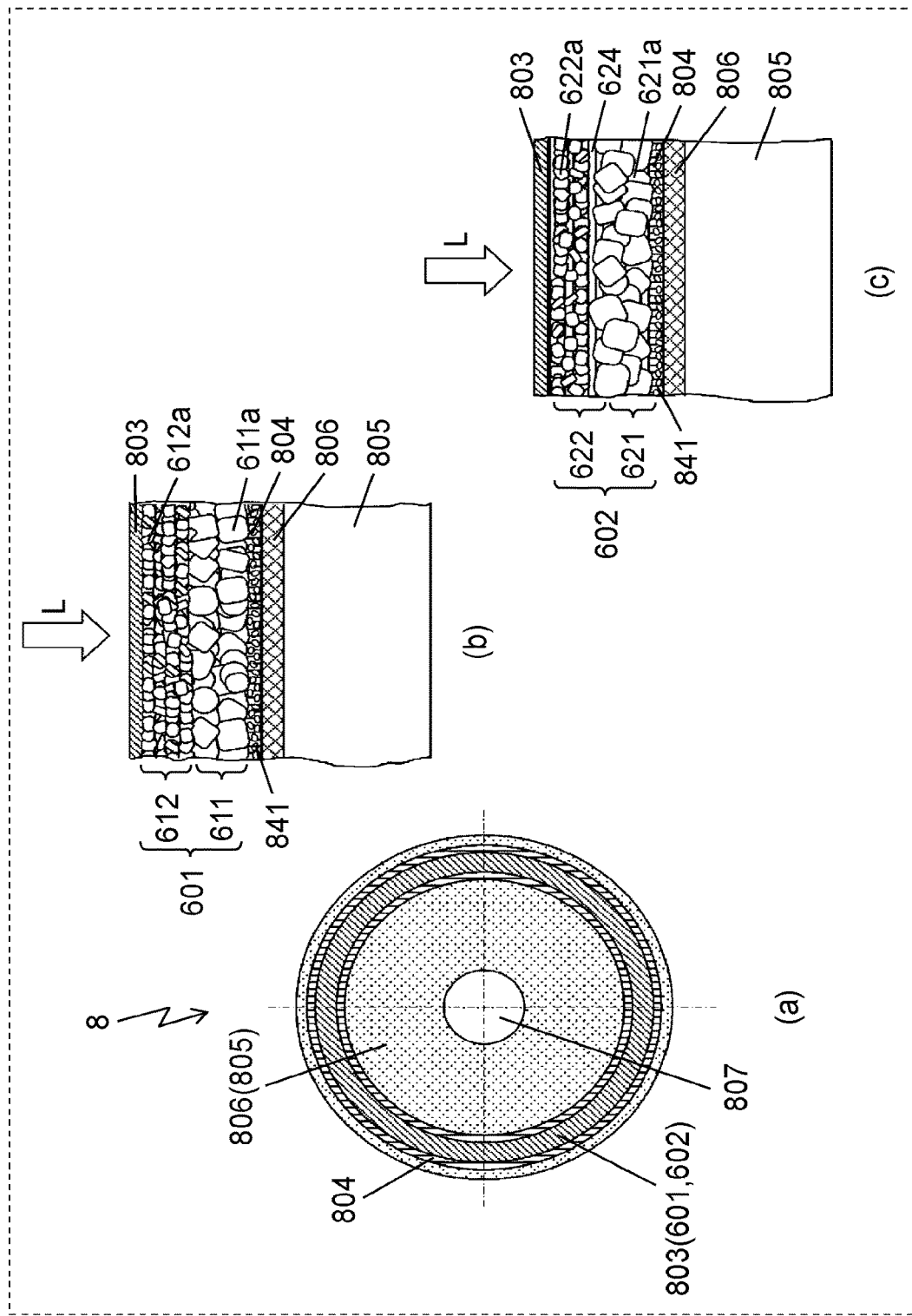
FIG. 10 is a diagram illustrating configurations of third and fourth phosphor wheels including respectively the first and second wavelength conversion elements in a ring shape according to the second exemplary embodiment.

FIG. 10 illustrates third and fourth phosphor wheels including wavelength conversion element 601, 602 according to the second exemplary embodiment. Part (a) of FIG. 10 is a plan view of the third and fourth phosphor wheels including wavelength conversion elements 601, 602, part (b) of FIG. 10 is a cross-sectional view of the third phosphor wheel including wavelength conversion element 601, and part (c) of FIG. 10 is a cross-sectional view of the fourth phosphor wheel including wavelength conversion element 602.

In phosphor wheel 8 as the third phosphor wheel including wavelength conversion element 601 illustrated in FIG. 10, a second phosphor region 612 side formed from phosphor particle 612a with a smaller particle size is positioned at an incident side of excitation light L. Similarly, in phosphor wheel 8 as the fourth phosphor wheel including wavelength conversion element 602, second phosphor region 622 formed from phosphor particle 622a with a smaller particle size is positioned at an incident side of excitation light L.

First, a configuration of phosphor wheel 8 including wavelength conversion element 601 will be described with reference to parts (a) and (b) of FIG. 10. As illustrated in part (b) of FIG. 10, phosphor wheel 8 has a phosphor ring including wavelength conversion element 601 with antireflection coating 803 on a surface and base plate 805 with reflection layer 806 on a surface, and silicon layer 804 filled with contained particle 841 to improve thermal conductivity and reflectance is provided between reflection layer 806 and the phosphor ring. Base plate 805 is provided with motor attachment hole 807.

Wavelength conversion element 601 as a phosphor ring is formed from phosphor particles 611a, 612a different in particle size as described above. The particle sizes of the phosphor particles are different in the thickness direction of the phosphor region. In this case, phosphor particle 612a on the front side is smaller in particle size than phosphor particle 611a on the base plate 805 side.

Next, a configuration of phosphor wheel 8 including wavelength conversion element 602 will be described with reference to parts (a) and (c) of FIG. 10.

As illustrated in part (c) of FIG. 10, phosphor wheel 8 has a phosphor ring including wavelength conversion element 602 with antireflection coating 803 on a surface and base plate 805 with reflection layer 806 on a surface, and silicon layer 804 filled with contained particle 841 to improve thermal conductivity and reflectance is provided between reflection layer 806 and the phosphor ring.

Wavelength conversion element 602 formed as a phosphor ring includes phosphor particles 621a, 622a different in particle size and binder 624 made of silicon, for example. The particle sizes of the phosphor particles are different in the thickness direction of the phosphor region. In this case, phosphor particle 622a on the front side is smaller in particle size than phosphor particle 621a on the base plate 805 side.

[2-1-2. Advantageous Effects and Others]

As in phosphor wheel 7 including wavelength conversion elements 601, 602, disposing the two kinds of phosphor particles different in particle size in the thickness direction of the phosphor region, that is, positioning the phosphor particle with a larger particle size on the front side and positioning the phosphor particle with a smaller particle size on the base plate side makes it possible to improve the coupling efficiency of the phosphor wheel formed only from the phosphor particle with a larger particle size, and improve the absorption efficiency of the phosphor wheel formed only from the phosphor particle with a smaller particle size, thereby improving the efficiency on the whole.

In addition, as in phosphor wheel 8 including wavelength conversion elements 601, 602, positioning the phosphor particle with a smaller phosphor particle on the front side and positioning the phosphor particle with a larger particle size on the base plate side makes it possible to improve the coupling efficiency of the phosphor wheel formed only from the phosphor particle with a larger particle size, and improve the thermal conductive characteristic of the phosphor wheel formed only from the phosphor particle with a smaller particle size, thereby improving the fluorescent light efficiency.

In addition, although the phosphor wheel in the first exemplary embodiment is formed from the three kinds of phosphor particles different in particle size, the phosphor wheel in the second exemplary embodiment is formed from the two kinds of phosphor particles different in particle size to provide an advantageous effect of facilitating the manufacture.

[2-2-1. Configurations of Light Source Devices Including the Phosphor Wheel]

The first to third light source devices illustrated in FIGS. 11, 13, and 15 can be formed by replacing the wavelength conversion elements included in the first to third phosphor wheels in the first exemplary embodiment with the wavelength conversion elements in the second exemplary embodiment. In this case, the behavior of the light source devices is identical to that of the light source devices in the first exemplary embodiment, and thus description of the behavior will be omitted.

[2-2-2. Advantageous Effects and Others]

As described above in relation to the advantageous effects of the phosphor wheel including the wavelength conversion element according to the second exemplary embodiment, disposing the two kinds of phosphor particles different in particle size in the thickness direction of the phosphor region makes it possible to improve the coupling efficiency of the light source device including the phosphor wheel formed only from the phosphor particle with a larger particle size. As compared to the light source device including the phosphor wheel formed only from the phosphor particle with a smaller particle size, positioning the larger phosphor particle on the front side improves the absorption efficiency, and positioning the smaller phosphor particle on the front side improves the thermal conductivity to improve the fluorescent light efficiency.

[2-3-1. Configurations of Projection Display Apparatuses Including the Light Source Device]

The projection display apparatuses including the first to third light source devices illustrated in FIGS. 12, 14, and 16 can be formed by replacing the wavelength conversion elements included in the first to third phosphor wheels in the first exemplary embodiment with the wavelength conversion elements in the second exemplary embodiment.

[2-3-2. Advantageous Effects and Others]

As described above in relation to the advantageous effects of the phosphor wheel including the wavelength conversion element according to the second exemplary embodiment, disposing the two kinds of phosphor particles different in particle size in the thickness direction of the phosphor region makes it possible to improve the coupling efficiency of the projection display apparatus including the light source device including the phosphor wheel formed only from the phosphor particle with a larger particle size. In addition, this improves the absorption efficiency of the projection display apparatus including the light source device including the phosphor wheel formed only from the phosphor particle with a smaller particle size, thereby improving the efficiency on the whole.

Third Exemplary Embodiment

[3-1. Configurations of Wavelength Conversion Elements]

Figure 17:
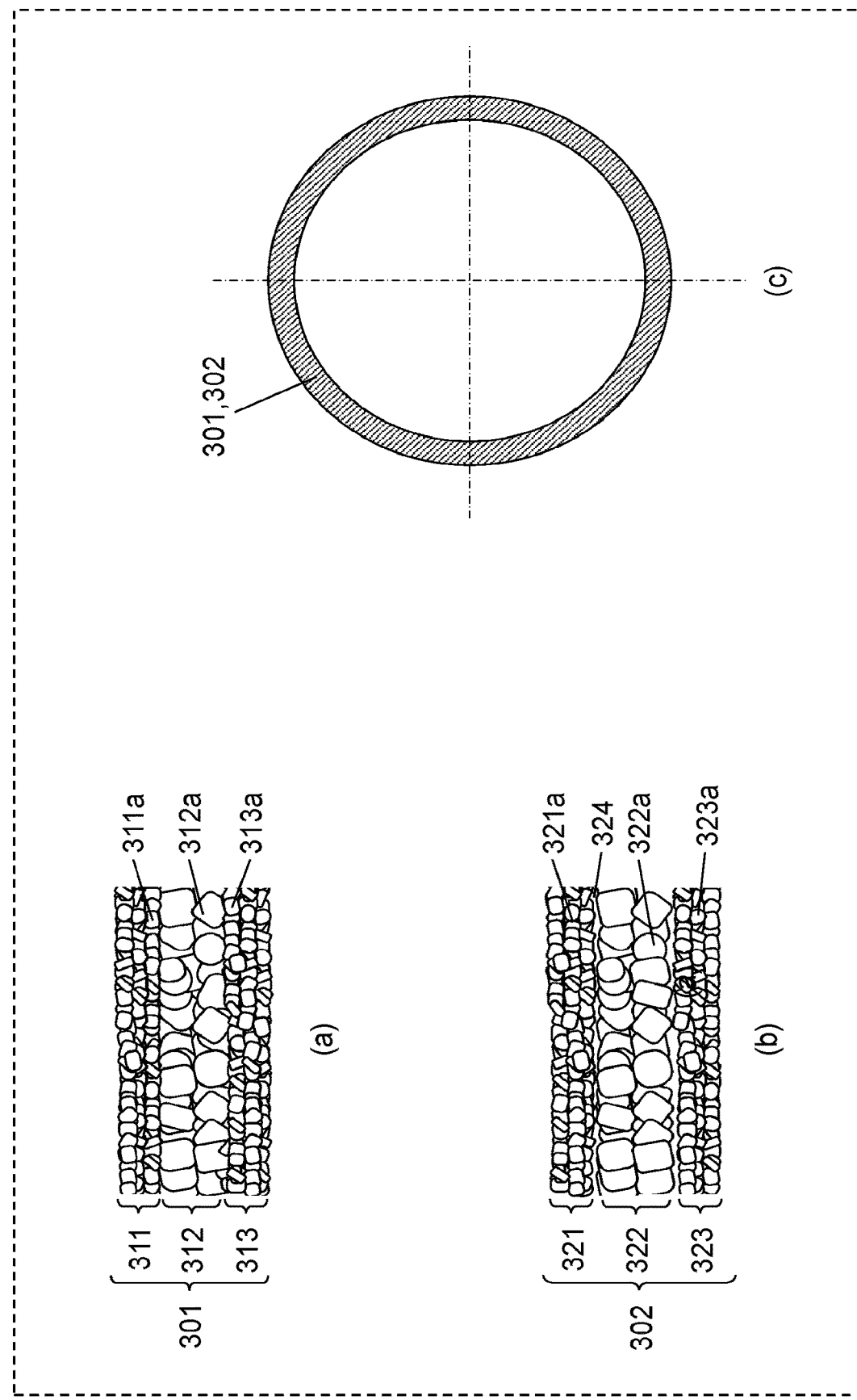
FIG. 17 is a diagram illustrating configurations of a wavelength conversion element according to a third exemplary embodiment.

Hereinafter, configurations of wavelength conversion elements according to a third exemplary embodiment will be described. FIG. 17 is a diagram illustrating configurations of the wavelength conversion elements according to the third exemplary embodiment. Part (a) of FIG. 17 is a cross-sectional view of wavelength conversion element 301, part (b) of FIG. 17 is a cross-sectional view of wavelength conversion element 302, and part (c) of FIG. 17 is a plan view of a phosphor ring formed by using wavelength conversion element 301, 302.

Wavelength conversion element 301 illustrated in part (a) of FIG. 17 includes a three-layer phosphor region formed by stacking first phosphor region 311 including phosphor particle 311a, second phosphor region 312 including phosphor particle 312a, and third phosphor region 313 including phosphor particle 313a. As illustrated in part (a) of FIG. 17, the phosphor particles different in particle size are disposed in the thickness direction of the phosphor region. In this case, the particle size of phosphor particle 312a constituting second phosphor region 312 disposed in a middle is larger than the particle size of phosphor particle 311a of first phosphor region 311 on a front side (upper side in part (a) of FIG. 17) and the particle size of phosphor particle 313a of third phosphor region 313 on a back side (lower side of part (b) of FIG. 17).

Phosphor particle 311a in first phosphor region 311 and phosphor particle 313a in third phosphor region 313 may be different or identical.

Wavelength conversion element 302 illustrated in part (b) of FIG. 17 includes a three-layer phosphor region formed by stacking first phosphor region 321 including phosphor particle 321a, second phosphor region 322 including fluorescent light body particle 322a, and third phosphor region 323 including phosphor particle 323a with binders 324 such as silicon or the like. As illustrated in part (b) of FIG. 17, phosphor particles different in particle size are disposed in a thickness direction of the phosphor region. In this case, the particle size of phosphor particle 322a constituting second phosphor region 322 disposed in a middle is larger than the particle size of phosphor particle 321a of first phosphor region 321 on a front side (upper side in part (b) of FIG. 17) and the particle size of phosphor particle 323a of third phosphor region 323 on a back side (lower side of part (b) of FIG. 17).

Phosphor particle 321a in first phosphor region 321 and phosphor particle 323a in third phosphor region 323 may be different or identical.

As described above, in wavelength conversion elements 301, 302, the particle size of the phosphor particle in the second phosphor region disposed in the middle is larger than the particle sizes of the phosphor particles in the other regions, which is different from wavelength conversion elements 101, 102 in the first exemplary embodiment in which the particle size of the phosphor particle in the second phosphor region disposed in the middle is smaller than the particle sizes of the phosphor particles in the other regions.

As illustrated in part (c) of FIG. 17, wavelength conversion elements 301, 302 have a ring shape. However, the shape of the phosphor ring may be a segment shape in which a ring is partially cut, or a polygonal shape such as a square.

[3-2. Phosphor Wheels, Light Source Devices, and Projection Display Apparatuses Including the Wavelength Conversion Element]

As in the first exemplary embodiment, the first to third phosphor wheels including wavelength conversion elements 301, 302 can be formed by replacing wavelength conversion element 101 in the first exemplary embodiment with wavelength conversion elements 301, 302.

In addition, the first to third phosphor wheels including wavelength conversion elements 301, 302 can be used as the first to third phosphor wheels used in the first to third light source devices in the projection display apparatus described above in relation to the first exemplary embodiment.

[3-3. Advantageous Effects and Others]

As described above, in wavelength conversion elements 301, 302 in the third exemplary embodiment, the phosphor particle with a smaller particle size is disposed on the incident side of excitation light L so that the coupling efficiency tends to improve as compared to the wavelength conversion element in the first exemplary embodiment. Accordingly, wavelength conversion elements 301, 302 are suitable for the case of reducing the size of an optical system in the subsequent stage of the projection display apparatus.

The present disclosure is applicable to a light source device in a projection display apparatus.

What is claimed is:

1. A wavelength conversion element comprising:
a first phosphor region including first phosphor particles; and
a second phosphor region including second phosphor particles, wherein
the first phosphor region is on the second phosphor region,
the first phosphor particles have a peak emission of fluorescent light,
the second phosphor particles have a peak emission of fluorescent light,
the peak emission of the first phosphor particles is same in color as the peak emission of the second phosphor particles, and
an average particle size of the first phosphor particles is larger than an average particle size of the second phosphor particles,
the wavelength conversion element further comprising a third phosphor region including third phosphor particles, wherein
the second phosphor region is between the first and the third phosphor regions,
the third phosphor particles have a peak emission of fluorescent light,
the peak emission of the third phosphor particles is same in color as the peak emissions of the first and the second phosphor particles, and
an average particle size of the third phosphor particles is larger than the average particle size of the second phosphor particles.

2. The wavelength conversion element according to claim 1, wherein the first and the second phosphor particles are excited by blue excitation light.

3. The wavelength conversion element according to claim 1, wherein the average particle size of the second phosphor particles is larger than one micron.

4. The wavelength conversion element according to claim 1, wherein the average particle size of the second phosphor particles is larger than one-tenth of the average particles size of the first phosphor particles and less than one-fifth of the average particle size of the first phosphor particles.

5. The wavelength conversion element according to claim 1, wherein the average particle size of the second phosphor particles is lager larger than one-tenth of the average particle size of the third phosphor particles and less than one-fifth of the average particle size of the third phosphor particles.

6. A phosphor wheel comprising:
the wavelength conversion element according to claim 1;
a base plate on which the wavelength conversion element is provided; and
a motor that rotationally drives the base plate.

7. The phosphor wheel according to claim 6, wherein the second phosphor region is between the first phosphor region and the base plate.

8. The phosphor wheel according to claim 6, wherein the wavelength conversion element has a ring shape.

9. The phosphor wheel according to claim 6, wherein the wavelength conversion element has a segment shape with a cutout portion in which a ring shape is partially cut.

10. The phosphor wheel according to claim 9, wherein
the base plate has an opening corresponding to the cutout portion, and
the wavelength conversion element and the opening are disposed at substantially a same distance from a rotation center of the phosphor wheel.

11. The phosphor wheel according to claim 6, wherein
the wavelength conversion element has a ring shape, and
a reflection layer is provided on a surface of a portion of the wavelength conversion element.

12. A light source device comprising the phosphor wheel according to claim 6.

13. A projection display apparatus comprising the light source device according to claim 12.

* * * * *